(12) United States Patent
Agarwal et al.

(10) Patent No.: US 12,019,807 B2
(45) Date of Patent: Jun. 25, 2024

(54) SOFT STRETCHABLE HIGH-DENSITY FLUIDIC ROUTING USING MULTI-CHANNEL TUBING, CONNECTORS, AND BREAKOUT

(71) Applicant: META PLATFORMS TECHNOLOGIES, LLC, Menlo Park, CA (US)

(72) Inventors: Priyanshu Agarwal, Kirkland, WA (US); Joseph Andrew Aase, Seattle, WA (US); Nicholas Colonnese, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 223 days.

(21) Appl. No.: 17/736,575

(22) Filed: May 4, 2022

(65) Prior Publication Data

US 2023/0133303 A1 May 4, 2023

Related U.S. Application Data

(60) Provisional application No. 63/274,477, filed on Nov. 1, 2021.

(51) Int. Cl.
| | |
|---|---|
| *G06F 3/01* | (2006.01) |
| *A41D 1/00* | (2018.01) |
| *A41D 19/00* | (2006.01) |
| *F16L 11/00* | (2006.01) |

(52) U.S. Cl.
CPC ............. *G06F 3/016* (2013.01); *A41D 1/002* (2013.01); *A41D 19/0024* (2013.01); *F16L 11/00* (2013.01)

(58) Field of Classification Search
None
See application file for complete search history.

(56) References Cited

U.S. PATENT DOCUMENTS

| | | | | |
|---|---|---|---|---|
| 5,631,861 | A * | 5/1997 | Kramer | G06F 3/016 703/7 |
| 2014/0261717 | A1* | 9/2014 | Egley | F16K 29/00 137/15.01 |
| 2016/0187979 | A1* | 6/2016 | Nahman | G06F 3/0488 345/156 |
| 2020/0294424 | A1* | 9/2020 | Song | G06F 3/016 |
| 2022/0129075 | A1* | 4/2022 | Kjos | B25J 9/0006 |

* cited by examiner

*Primary Examiner* — Jason T Yen
(74) *Attorney, Agent, or Firm* — Greenberg Traurig, LLP

(57) ABSTRACT

The disclosed system may include a fluidic system including a connector including a first side and a second side, each of the first side and the second side including a plurality of pins, a fluidic breakout configured to interface pneumatic tubing with a fluidic control system, pneumatic tubing including a plurality of fluidic channels, a first end configured to interface with the first side of the connector, and a second end configured to interface with the fluidic breakout, and a haptic feedback system including a plurality of actuators, each actuator coupled to a respective actuation tube configured to interface with a respective pin on the second side of the connector. Various other systems and methods are also disclosed.

20 Claims, 23 Drawing Sheets

SOFT STRETCHABLE HIGH-DENSITY FLUIDIC ROUTING USING MULTI-CHANNEL TUBING, CONNECTORS, AND BREAKOUT

CROSS REFERENCE TO RELATED APPLICATION

This application claims the benefit of U.S. Provisional Application No. 63/274,477, filed on Nov. 1, 2021, the disclosure of each of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
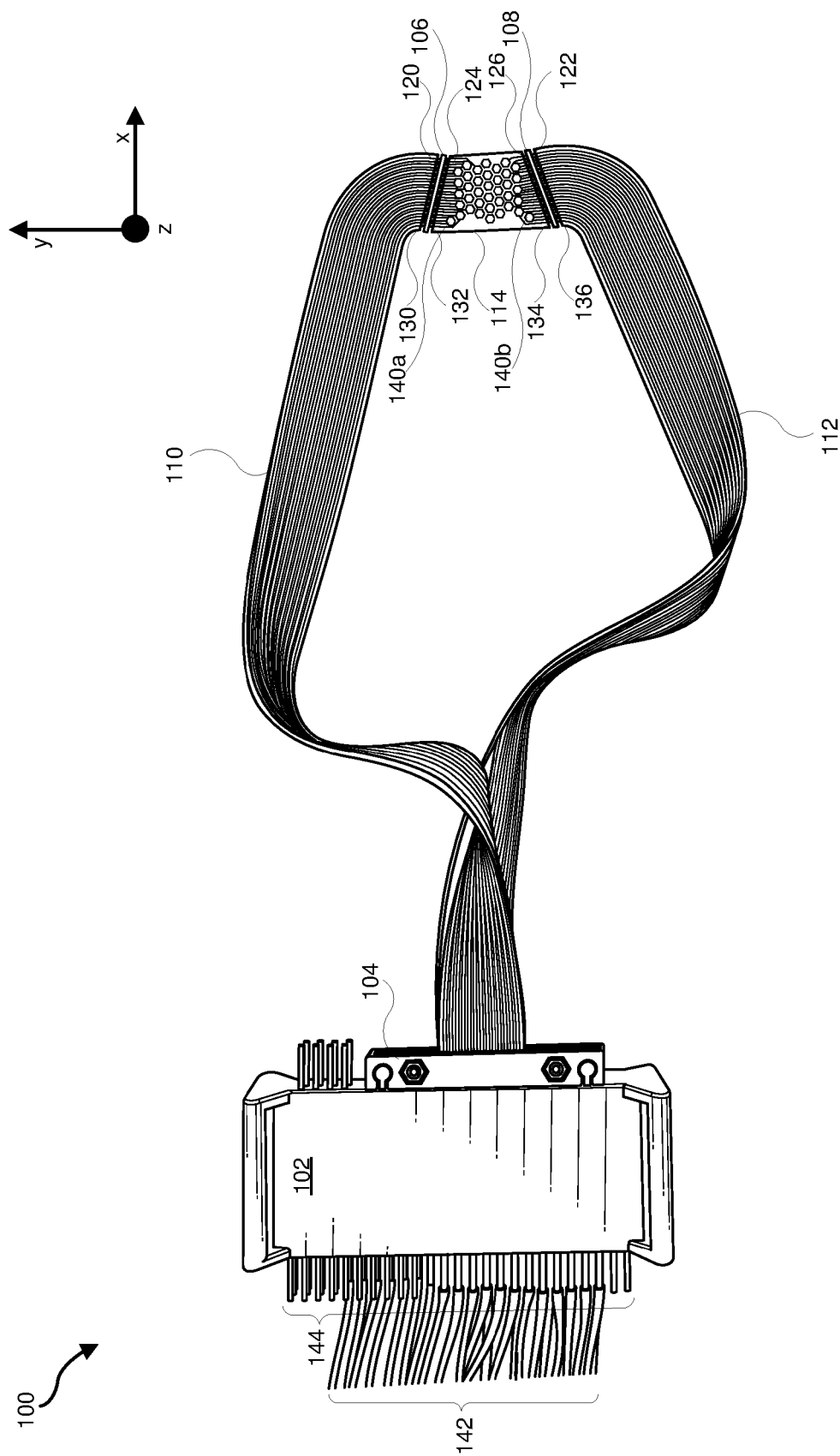
FIG. 1 is an illustration of a fluidic routing architecture for an example fluidic system that includes quick disconnect plug and play multichannel tubing, connectors, and breakout for fluidic systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

A bubble array may be a type of fluidic elastomeric actuator that may also be referred to as an inflatable bladder. Haptic devices in systems that incorporate kinesthetic and tactile learning, such as artificial reality systems, may use a set of actuators (e.g., bubbles) implemented, for example, as a bubble array. Considered an important part of an artificial reality system, haptic feedback may provide a realistic, high-fidelity experience to a user of the system. For example, an artificial reality system may include one or more haptic devices that may be handheld devices such as a joystick, wand, steering wheel, or other type of controller. In another example, an artificial reality system may include one or more haptic devices that may be wearable devices such as a glove. Each haptic device included in each wearable and handheld device may provide haptic feedback to a user of the artificial reality system.

In many applications, an important type of haptic feedback may be fine tactile pressure. In some implementations, a haptic feedback system may include fine tactile pressure as haptic feedback in order to provide a realistic, high-fidelity experience to a user of the haptic feedback system. The haptic feedback system may use the fine tactile feedback to recreate, for the user, a haptic sensation of object contact, edges, corners, gaps, and/or texture. In some implementations, providing haptic feedback for small, delicate, sensitive, and/or subtle characteristics of an object may be crucial for the precise manipulation of and/or interaction with virtual objects included in an artificial reality system such as a virtual reality (VR) system or an augmented reality (AR) system.

In some implementations, an artificial reality system may include a haptic feedback system that includes a soft deformable high-density set of actuators implemented as a bubble array. In some implementations, the bubble array may be a pneumatic bubble array. In some implementations, the soft deformable high-density set of actuators may be formed (e.g., manufactured) using a soft stretchable material with an optimum stiffness. Each actuator in the set of actuators may be individually actuated to render localized tactile pressure on a part of the human body (e.g., a hand). The density of the set of actuators may be determined so that the haptic feedback system renders sharp and continuous edges for objects that may be distinguishable from all tactile sensations perceived by a user of the artificial reality system during real object manipulation. Including a high-density set of actuators in a haptic feedback system may provide haptic feedback to a user that is close to a human perceptual resolution for the haptic feedback.

Figure 20:
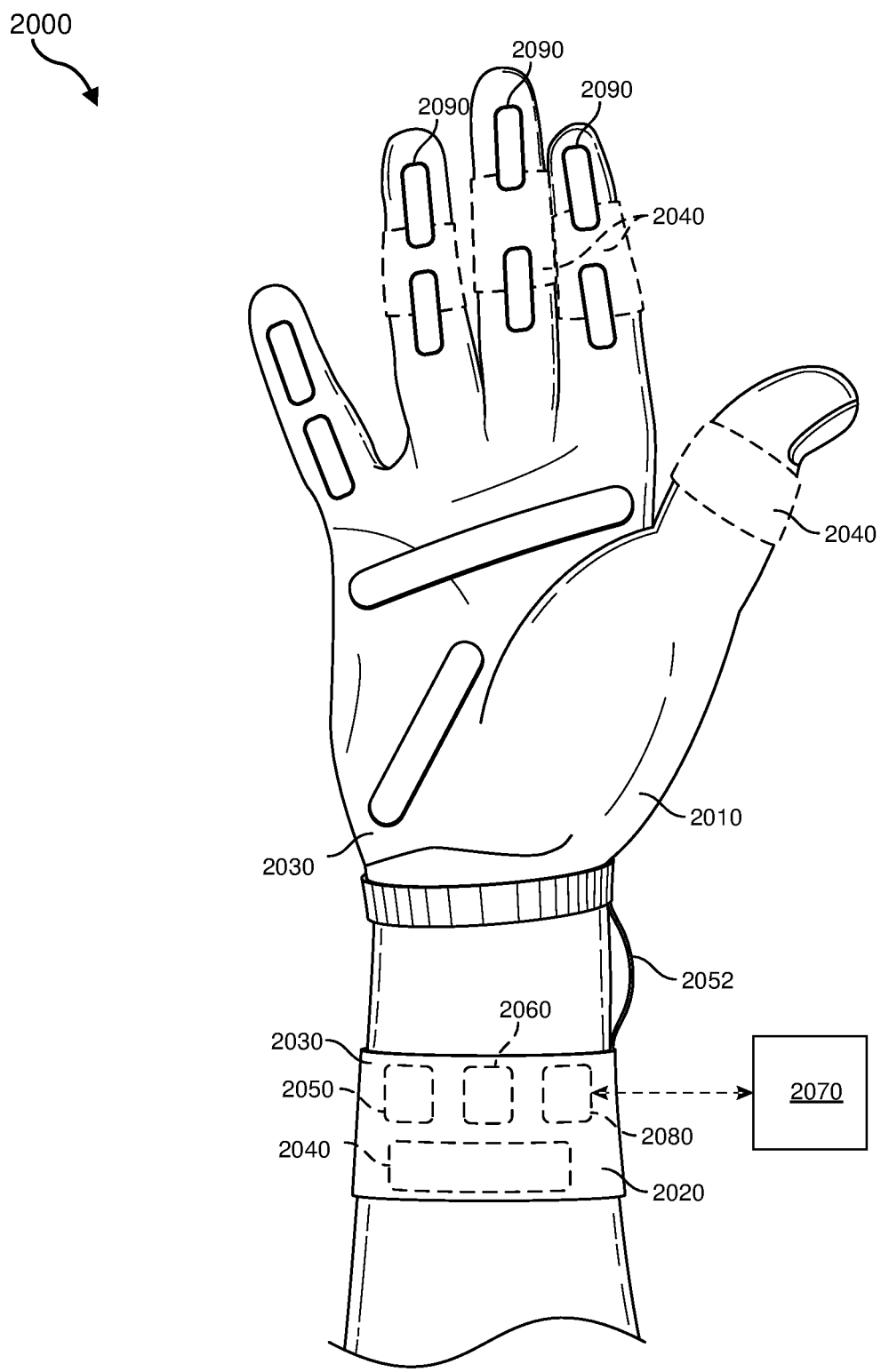
FIG. 20 is an illustration of exemplary haptic devices that may be used in connection with embodiments of this disclosure.
Figure 22:
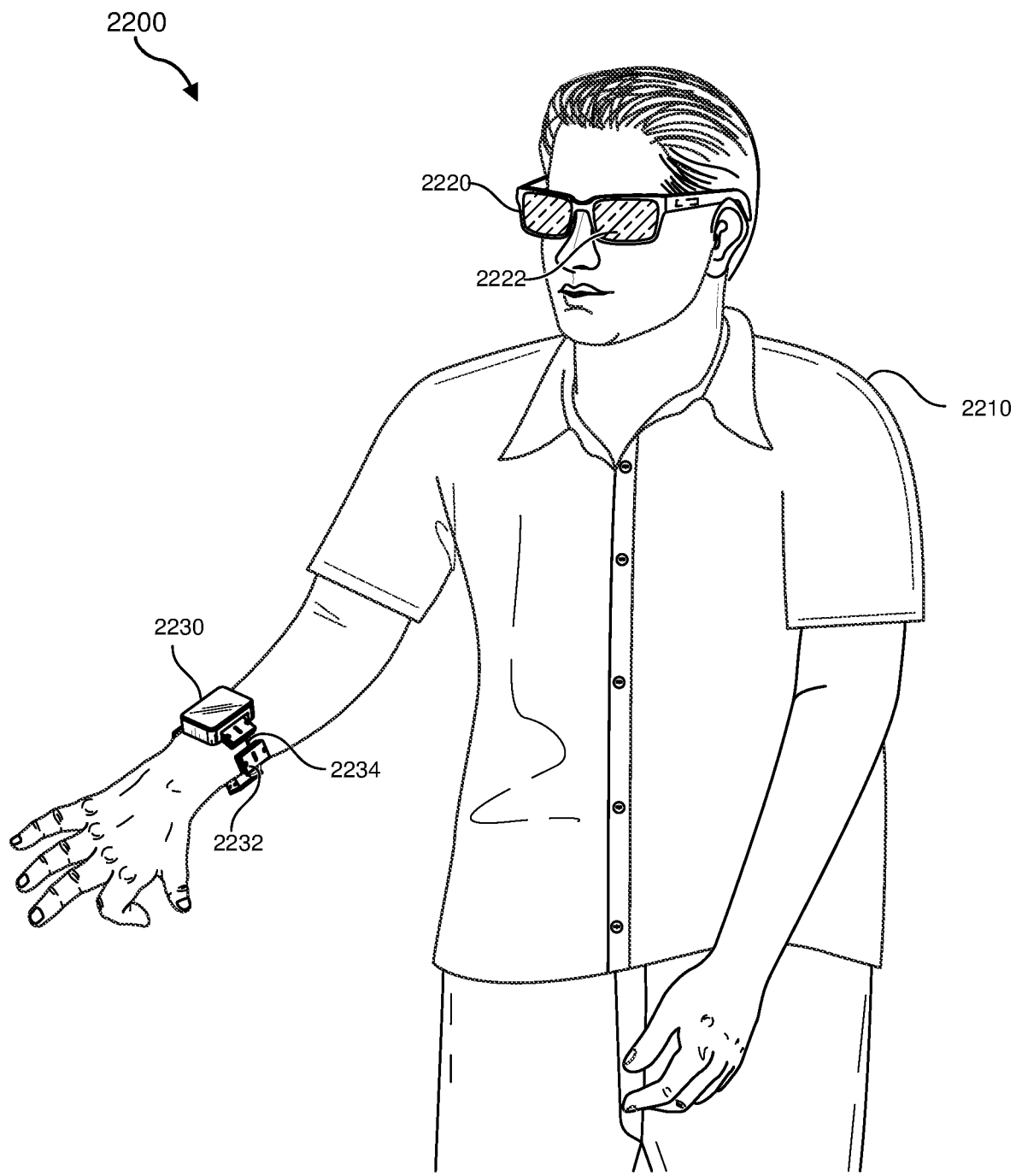
FIG. 22 is an illustration of an exemplary augmented-reality environment according to embodiments of this disclosure.

In addition, or in the alternative, the use of a soft deformable high-density set of actuators implemented as a bubble array in a haptic feedback system may allow the haptic feedback system to achieve actuation of an actuator at a relatively low pneumatic pressure for the actuator. The use of a lower pneumatic pressure for actuation of the actuator may allow the haptic feedback system to include a smaller pneumatic source. The smaller pneumatic source may contribute to a reduction in the size of the haptic feedback system. Forming, making, and/or manufacturing the soft deformable high-density set of actuators in a low encumbrance form-factor with deformable materials (e.g., a soft stretchable material with an optimum stiffness) that may achieve actuation at a low pneumatic pressure may ensure that the set of actuators may be easily integrated into fully untethered wearables that may operate on a battery. Examples of a fully untethered wearable may include, but are not limited to, a glove (e.g., haptic device 2010 as shown in FIG. 20), a headband, an armband or wristband (e.g., haptic device 2230 as shown in FIG. 22), a finger band or ring, a sleeve, a sock, a shirt, and pants.

High density haptic actuation with fluidic actuators for use in AR systems and/or VR systems may include fluidic routing that may deliver fluid to the actuators in a low encumbrance form-factor. In addition, or in the alternative, the integration of systems that deliver high density haptic actuation with fluidic actuators in a low encumbrance form-factor into wearable devices, such as a glove, may include tubing that may be easily deformed and stretched to match the complex articulated structure of human limbs, such as the hand, without significantly restricting or impeding the motion of the limbs in order to achieve transparent interaction in the AR or VR space. In addition, or in the alternative, the routing of the tubing may be determined to allow pressure-flow characteristics of the tubing to not be significantly altered (to remain consistent) during articulation of the human limb (e.g., flexion, bending, and/or extending of the fingers). The articulation of the human limb may adversely impact the resulting haptic sensation. Also, for maintaining the modularity of the fluidic system for inclusion in wearable devices, the fluidic routing may be determined in a manner that allows different components of the wearable device to be quickly assembled and/or disassembled for a plug and play experience for a user of the wearable device.

In some implementations, a fluidic system may include a fluidic haptic feedback system that uses individual tubing to power individual actuators. Such a fluidic system may use an increasingly large number of tubes as the density of fluidic actuators in a haptic display increases. For example, a haptic display, which may also be referred to herein as a haptic bubble display, may be a haptic feedback system implemented as a pneumatic bubble array that includes multiple actuators. Routing an individual tube to each actuator may result in each tube being designed with a wall thickness capable of handling the fluidic pressure necessary for the actuator to deliver the desired haptic sensation. The need for such a wall thickness may result in the use of excess tubing material for delivery of the fluid since the walls between individual tubes may not be shared. The use of excess material, especially over articulated joints (e.g., finger joints), may result in additional structural stiffness of the routing infrastructure for the operation of the haptic display. In addition, or in the alternative, the routing of tubing over articulate joints (e.g., finger joints) may require that either enough slack is present in the tubing or that the tubing is stretchable to accommodate for the change in length of the routing as the finger is articulated. All these factors may result in a large tubing encumbrance (both in form-factor and stiffness) for such fluidic systems, making it challenging to develop high density haptic displays that deliver transparent haptic interactions, especially in a wearable form-factor.

In some implementations, the fluidic routing of an individual tube to each individual actuator may be permanently integrated to the actuators. The permanent integration or connection of each tube to each actuator may make it difficult to quickly assemble and/or disassemble different components of the fluidic system. The quick and easy assembly and/or disassembly of the different components of the fluidic system may be considered an important feature of a plug and play experience. In addition, or in the alternative, in systems where the fluidic routing may be permanently integrated to the actuators failure of any of the components may result in replacement of the entire fluidic system including the actuators. In addition, or in the alternative, in systems where the fluidic routing may be permanently integrated to the actuators, the actuators may be permanently bonded to a wearable device (e.g., glove). A failure of a single component of such a system included in a wearable device may render the wearable device useless, therefore requiring replacement of an entire wearable device to accommodate for what may be a failure of an individual component.

Described herein is a fluidic routing architecture for use in high density haptic actuation systems with fluidic actuators for use in fluidic systems for AR systems and/or VR systems. In some implementations, an AR system and/or a VR system may benefit from fluidic systems that provide fluidic routing that delivers fluid to the actuators in a low encumbrance form-factor that preserves the modularity of the fluidic system, enables quick assembly and/or disassembly of the different components in the system and therefore, and delivers a plug and play experience for wearable haptic systems (e.g., wearable devices). The fluidic routing architecture may connect high density fluidic actuators to multichannel tubing through multichannel fluidic needles. The multichannel tubing may then be connected to a plug and play pneumatic breakout, which converts the individual channels from the high-density tubing to individual tubes that may be connected to a fluidic control system (e.g., pressure regulators or fluidic valves). The fluidic system has the benefit of assembly without the use of permanent adhesive bonding between components. Such assembly provides a modular system for the wearable haptic system (e.g., the wearable device). Having such a modular system allows for any failed components to be easily replaced without the need to replace the entire wearable device. In addition, or in the alternative, the entire modular system may be easily assembled without the use of any complex manufacturing and/or assembly processes.

The present disclosure is generally directed to systems and methods for implementing a fluidic routing architecture for use in high density haptic actuation systems with fluidic actuators for use in fluidic systems for AR systems and/or VR systems. Such high-density haptic actuation systems with fluidic actuators may be used in and easily incorporated into wearable devices in a plug and play system for the wearable device. An example fluidic system may include at least one connector comprising a first side and a second side. Each of the first side and the second side of the connector may include a plurality of pins. A fluidic breakout may be configured to interface to at least a single pneumatic tubing and to a fluidic control system. The pneumatic tubing may include a plurality of fluidic channels, a first end configured to interface with the first side of the connector, and a second end configured to interface with the fluidic breakout. A haptic feedback system may include a plurality of actuators. Each actuator of the plurality of actuators may be coupled to, connected to, or interfaced with a respective actuation tube for the actuator. An actuation tube may be configured to be coupled to, connected to, or interfaced with a respective pin on the second side of the connector. A fluidic breakout may interface the pneumatic tubing with a fluidic control system for use in providing haptic feedback to a user of the wearable device. The fluidic system may provide soft stretchable high-density fluidic routing using multi-channel tubing, connectors, and a fluidic breakout in a modular system for use in wearable devices.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 7:
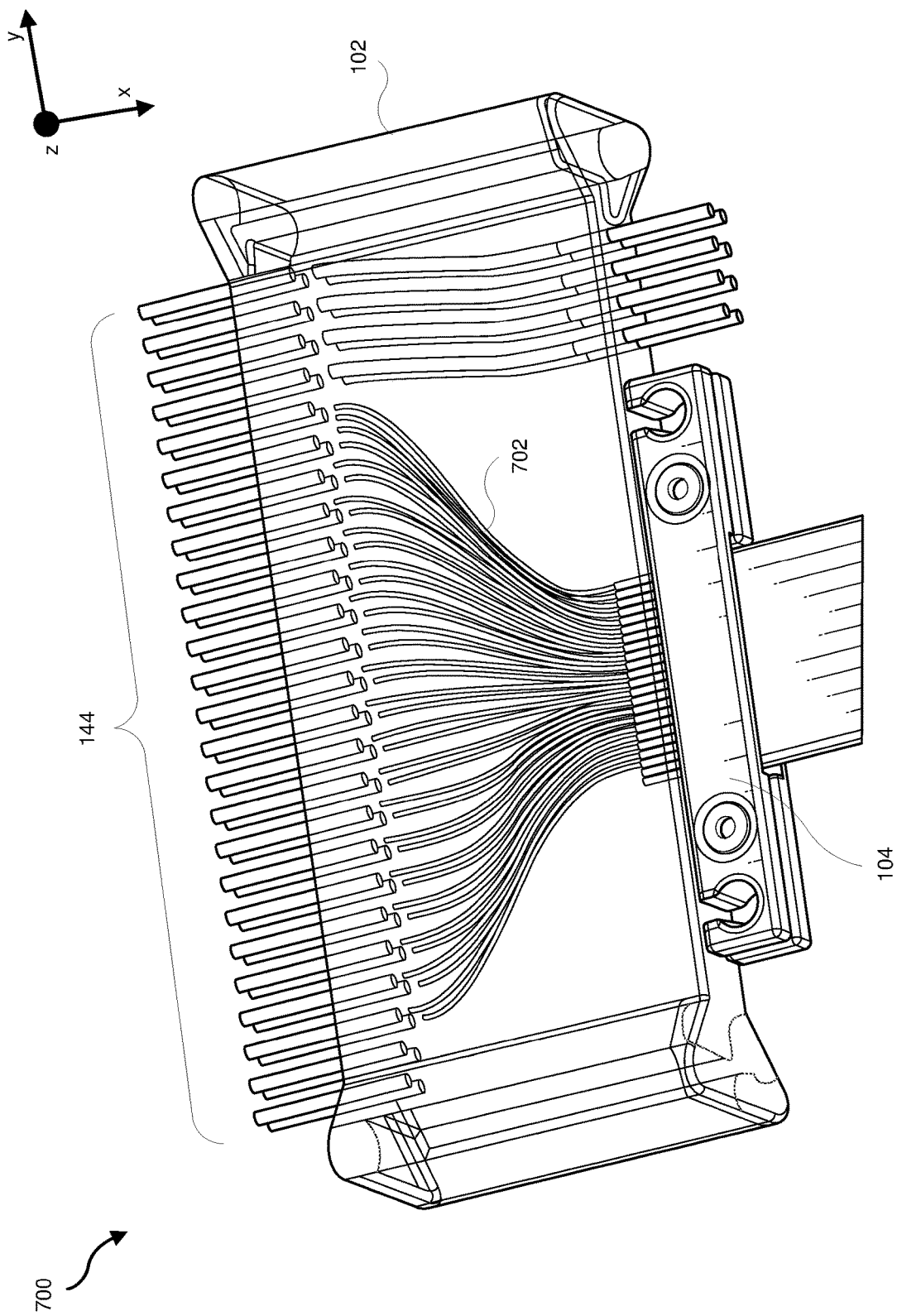
FIG. 7 is an illustration of an example internal structure of a fluidic breakout that allows for direct plugging of pneumatic tubing to a plurality of pins or needles that protrude from the structure of fluidic breakout.
Figure 8:
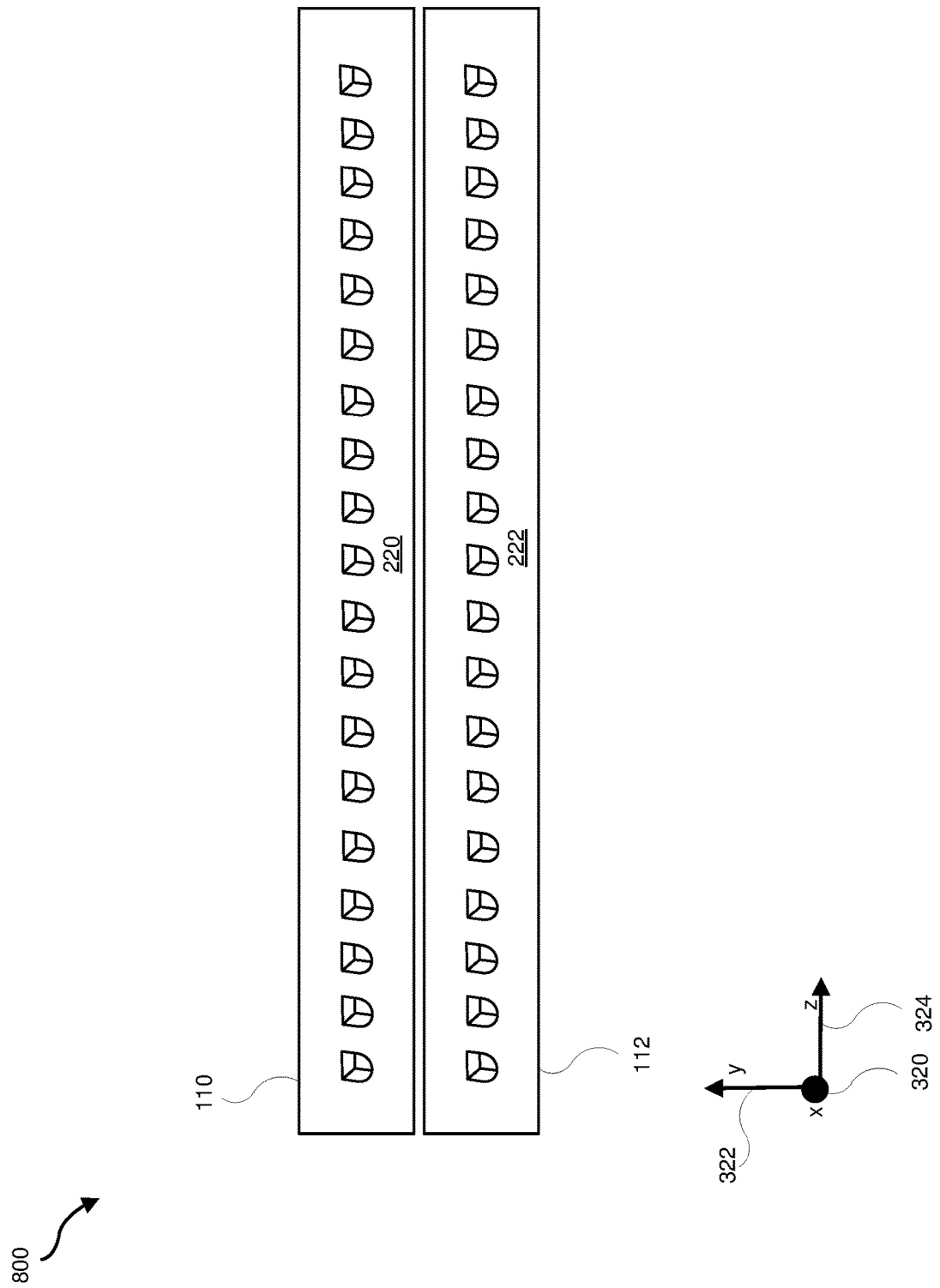
FIG. 8 is an illustration of a view of multichannel tubing for a fluidic system as it is placed in a mechanical clamp.
Figure 9:
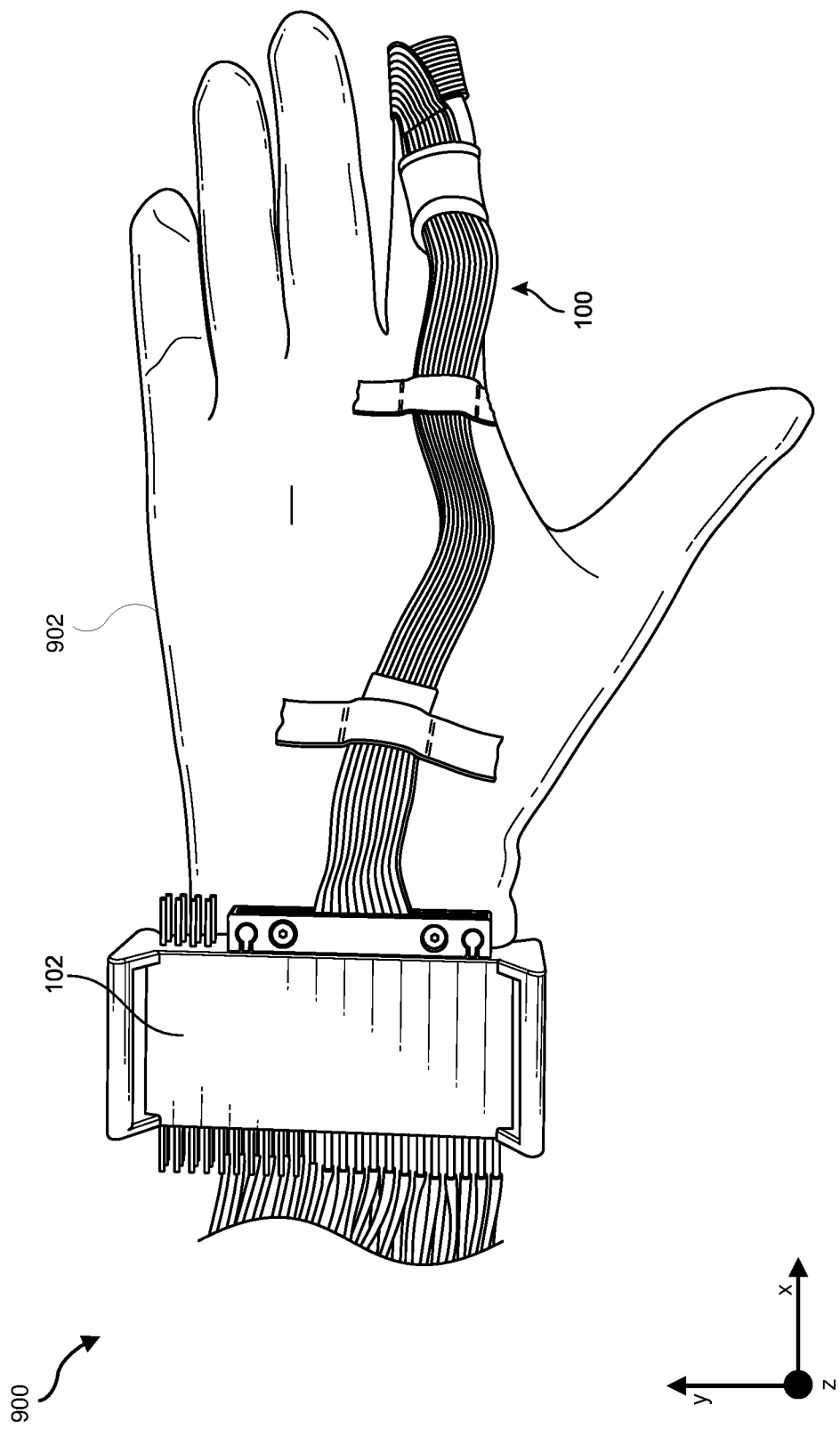
FIGS. 9-11 include illustrations of an example fluidic system integrated with a glove.
Figure 10:
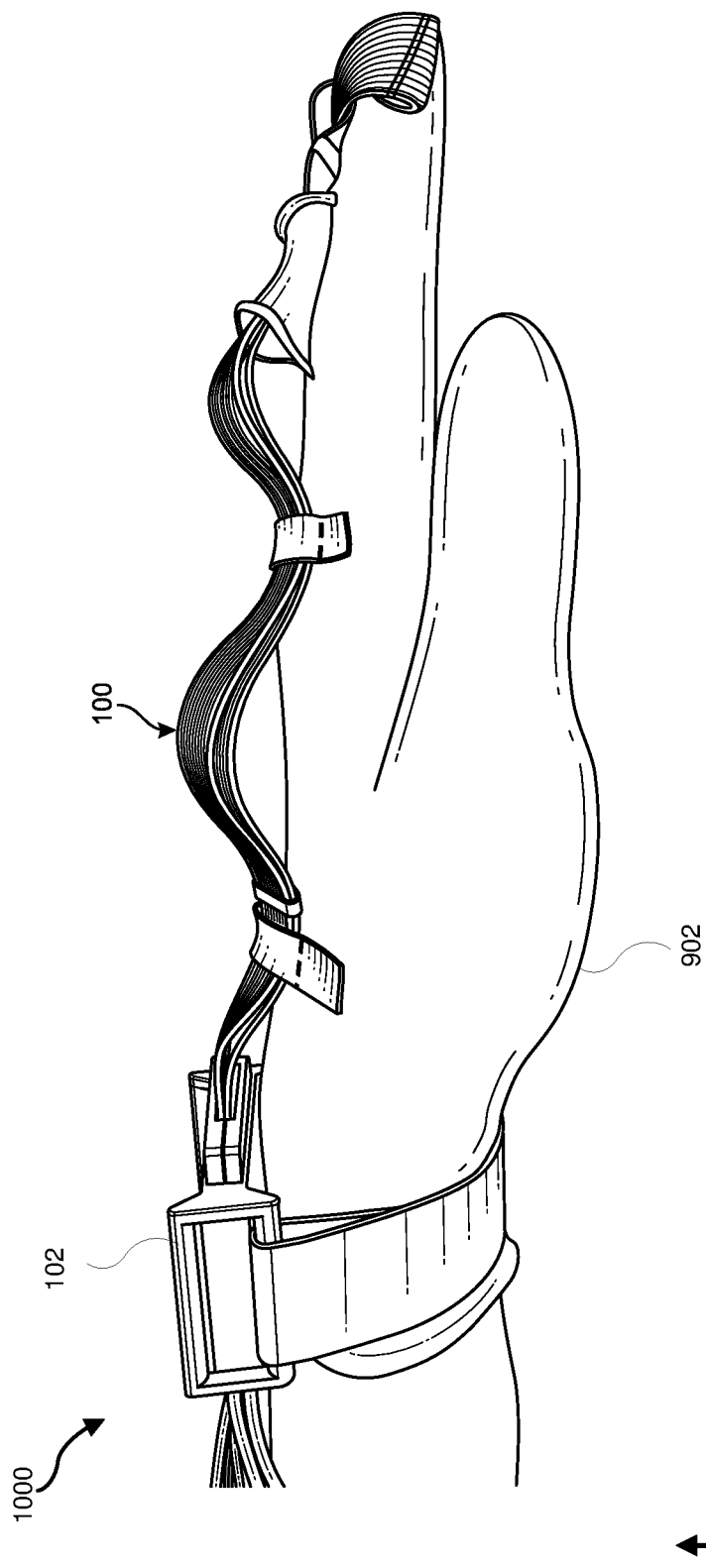
Figure 11:
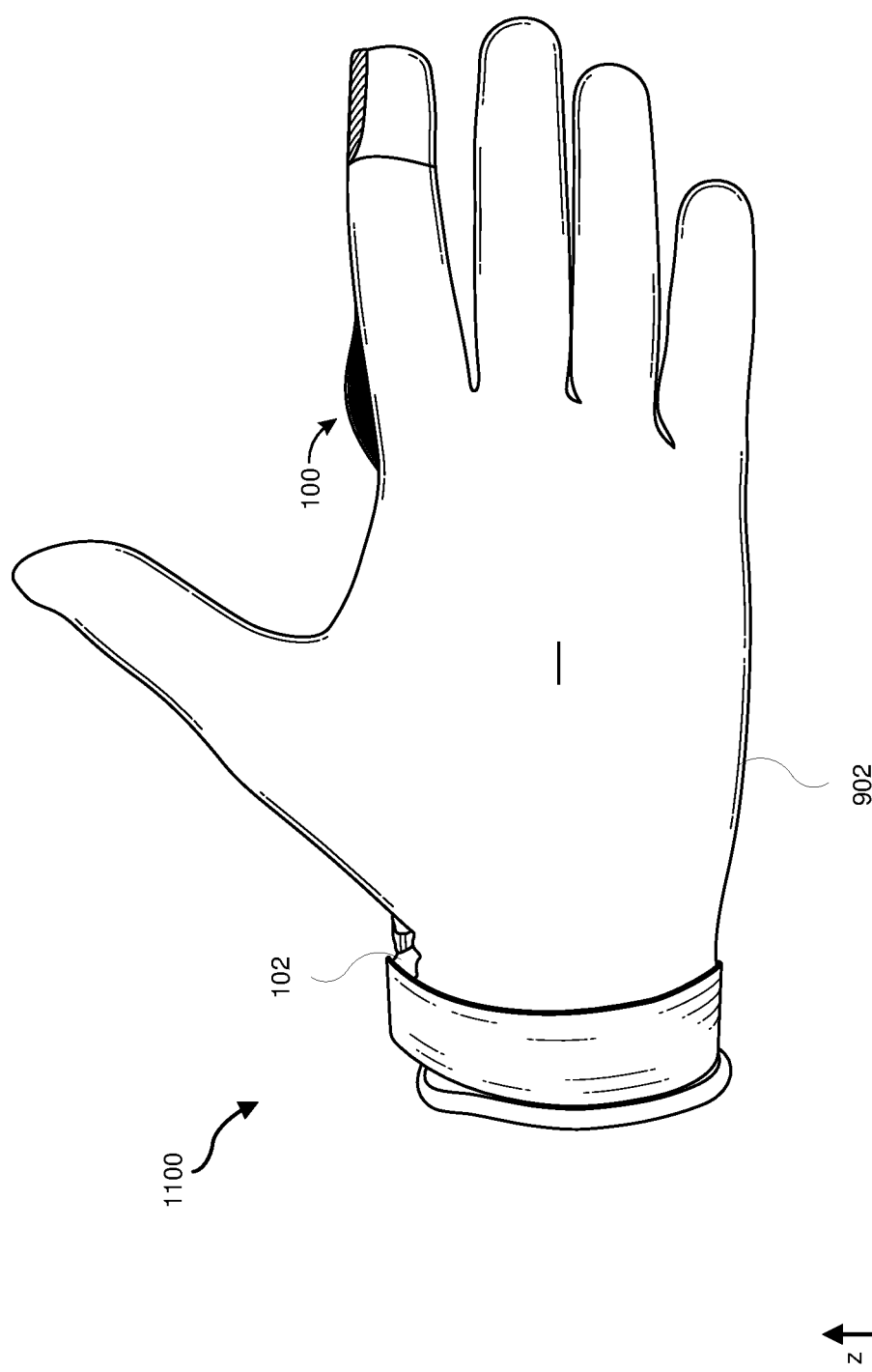
Figure 12:
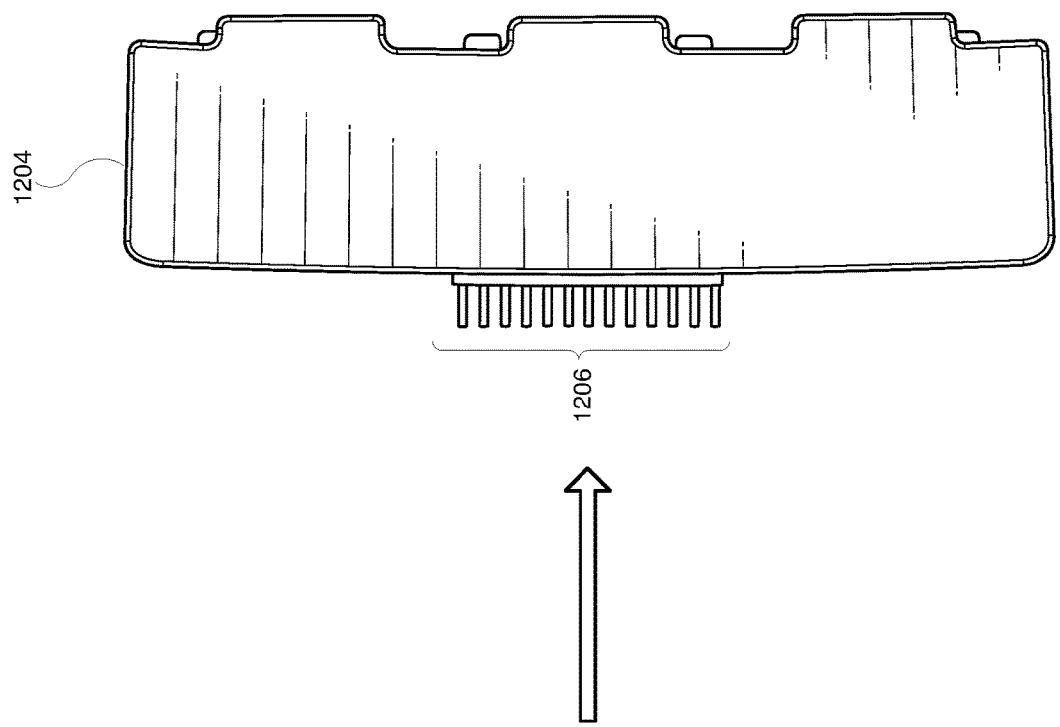
FIG. 12 is an illustration of an example fluidic breakout in silicone.
Figure 12:
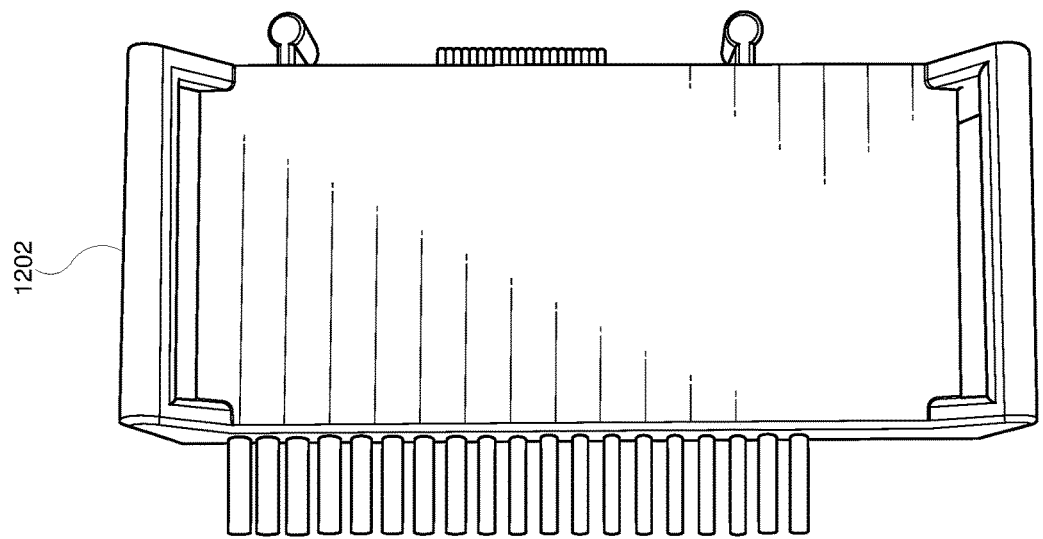
Figure 13:
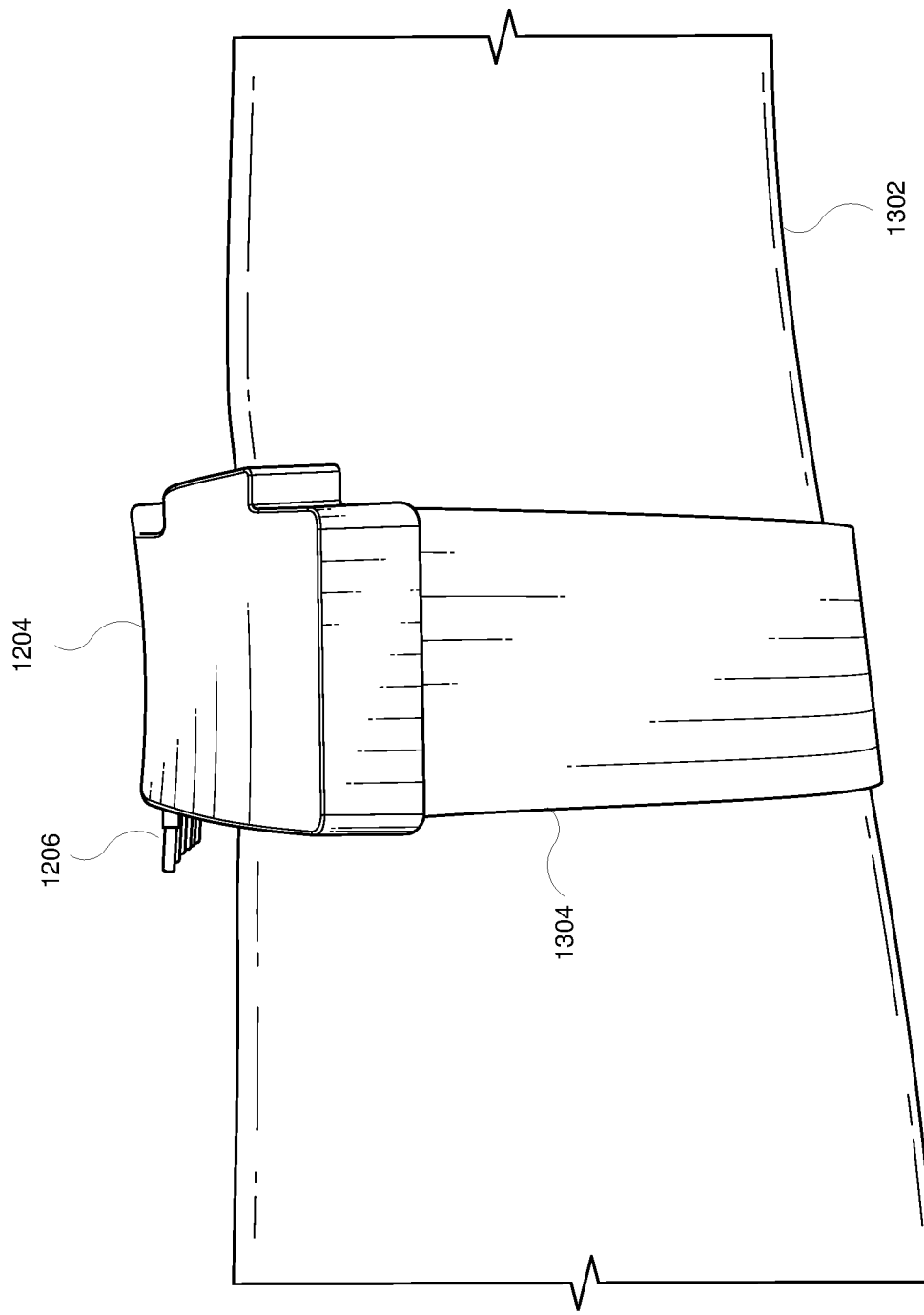
FIG. 13 is an illustration of an example silicone fluidic breakout on a wrist of a user.
Figure 14B:
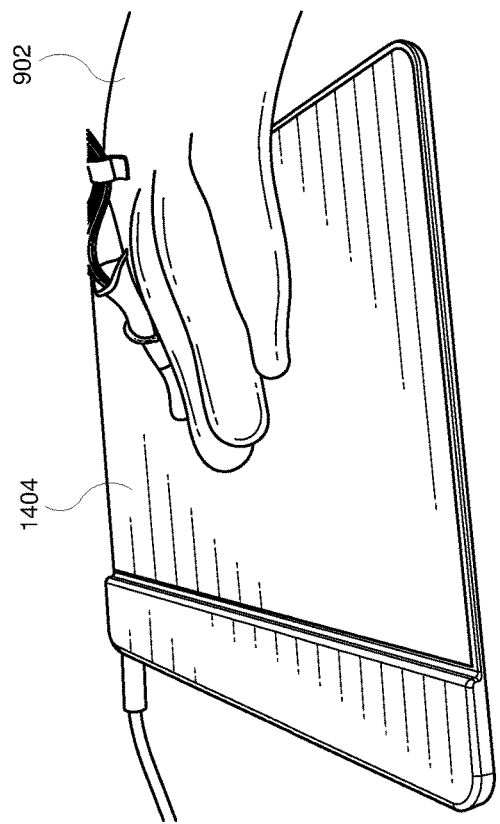
FIGS. 14A-C are illustrations of an example demonstration of a wearable glove in a virtual reality system.
Figure 14A:
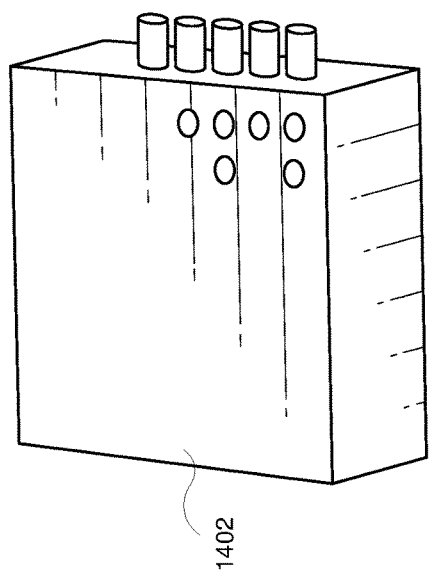
Figure 14C:
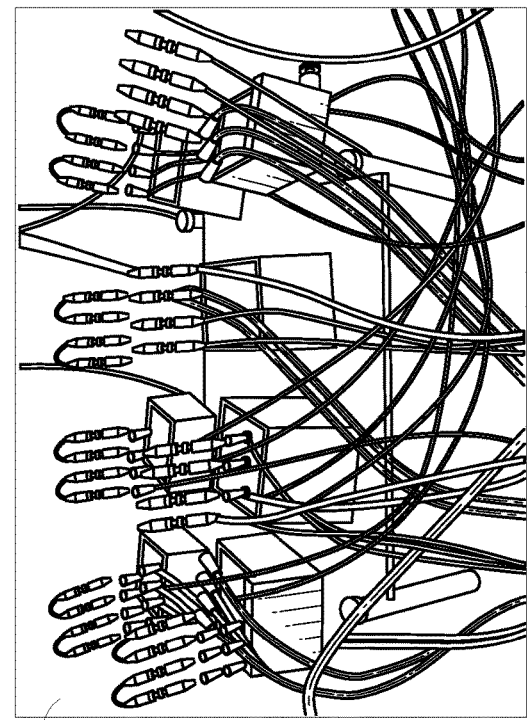
Figure 15:
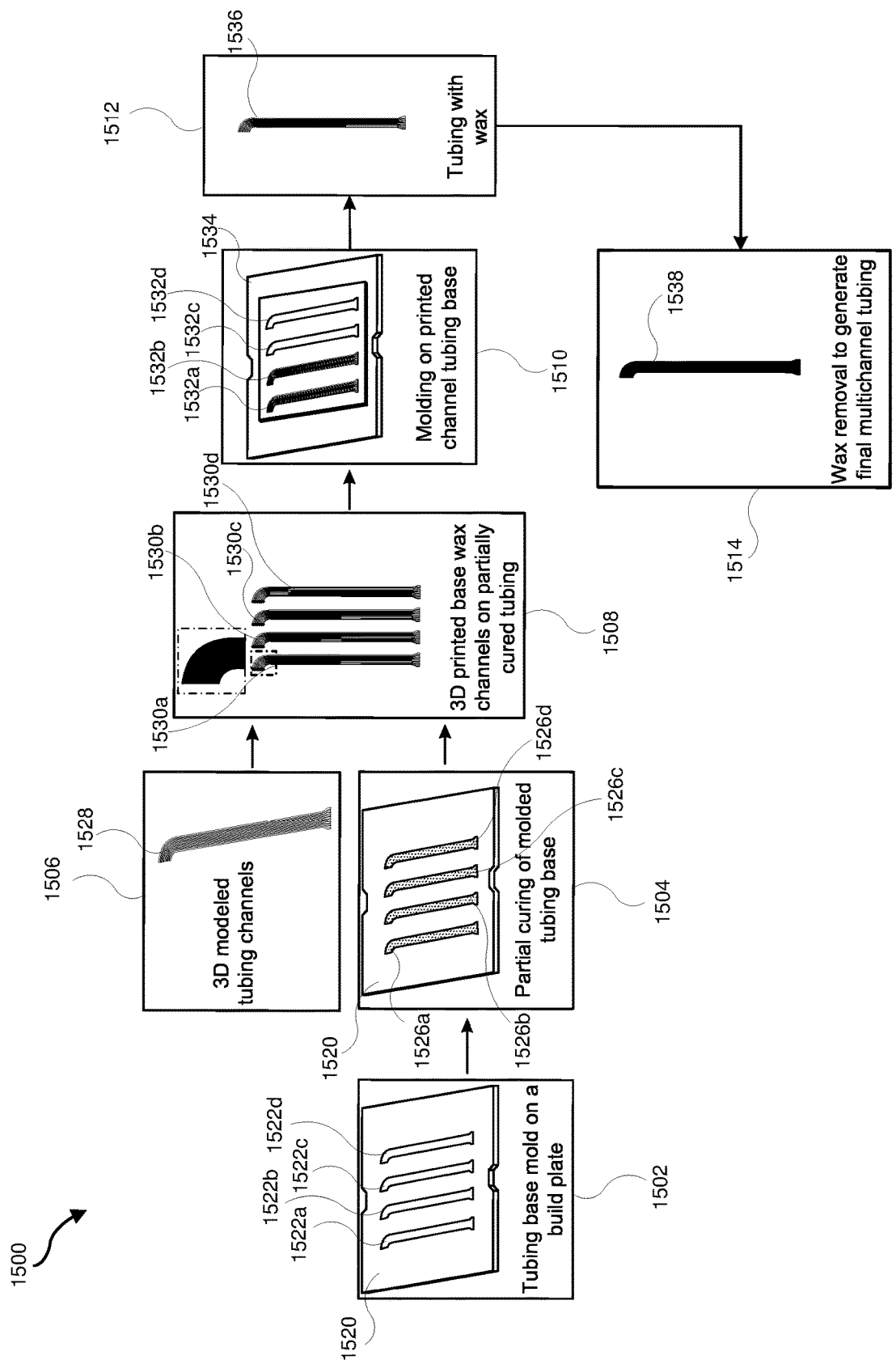
FIG. 15 is a block diagram of an example process for creating molded multichannel soft stretchable tubing.

The following will provide, with reference to FIGS. 1, 2, 3A-B, and 4-8 illustrations of a fluidic routing architecture for an example fluidic system, with reference to FIGS. 9-11 illustrations of an example fluidic system integrated with a glove, with reference to FIGS. 12 and 13 illustrations of an example three-dimensionally printed (3D printed) silicone fluidic system, with reference to FIGS. 14A-C an illustration of an example demonstration of a wearable glove in a virtual reality system, and with reference to FIG. 15 a block diagram of an example process for creating molded multi-channel soft stretchable tubing.

FIG. 1 is an illustration of a fluidic routing architecture for an example fluidic system 100. FIGS. 2, 3A-B, and 4-8 include detailed illustrations of one or more of the components included in the example fluidic system 100. The example fluidic system 100 may include quick disconnect plug and play multichannel tubing (e.g., first pneumatic tubing 110, second pneumatic tubing 112), connectors (e.g., first connector 106, second connector 108), at least one haptic feedback system (e.g., haptic feedback system 114), and a fluidic breakout interface (e.g., fluidic breakout 102). The haptic feedback system may include one or more actuators (e.g., actuators 140a-b). The fluidic breakout 102 may include a mechanical clamp 104, one or more needles 144, and one or more tubes 142 connected or coupled to a respective needle of the needles 144. The example fluidic system 100 may be assembled to deliver fluid to actuators in a low encumbrance form-factor with deformable materials.

The fluidic system 100 may include the first pneumatic tubing 110 and the second pneumatic tubing 112. A first end 120 of the first pneumatic tubing 110 may be coupled to, connected to, or interfaced with a side or end (e.g., side 130) of the first connector 106. The fluidic system 100 may include the second pneumatic tubing 112. A first end 122 of the second pneumatic tubing 112 may be coupled to, connected to, or interfaced with a side or end (e.g., side 136) of the second connector 108.

The fluidic system 100 may include a haptic feedback system 114. A first side 124 of the haptic feedback system 114 may be coupled to, connected to, or interfaced with a side or end (e.g., side 132) of the first connector 106. The side 132 of the first connector 106 may be opposite to the side 130 of the first connector 106. A second side 126 of the haptic feedback system 114 may be coupled to, connected to, or interfaced with a side or end (e.g., side 134) of the second connector 108. The side 134 of the second connector 108 may be opposite to the side 136 of the second connector 108. The first side 124 of the haptic feedback system 114 may be opposite to the second side 126 of the haptic feedback system 114. The coupling of the haptic feedback system 114 to the first pneumatic tubing 110 and the second pneumatic tubing 112 by way of the first connector 106 and the second connector 108, respectively, may allow for quick and easy disconnect of the pneumatic tubing from the haptic feedback system.

Figure 2:
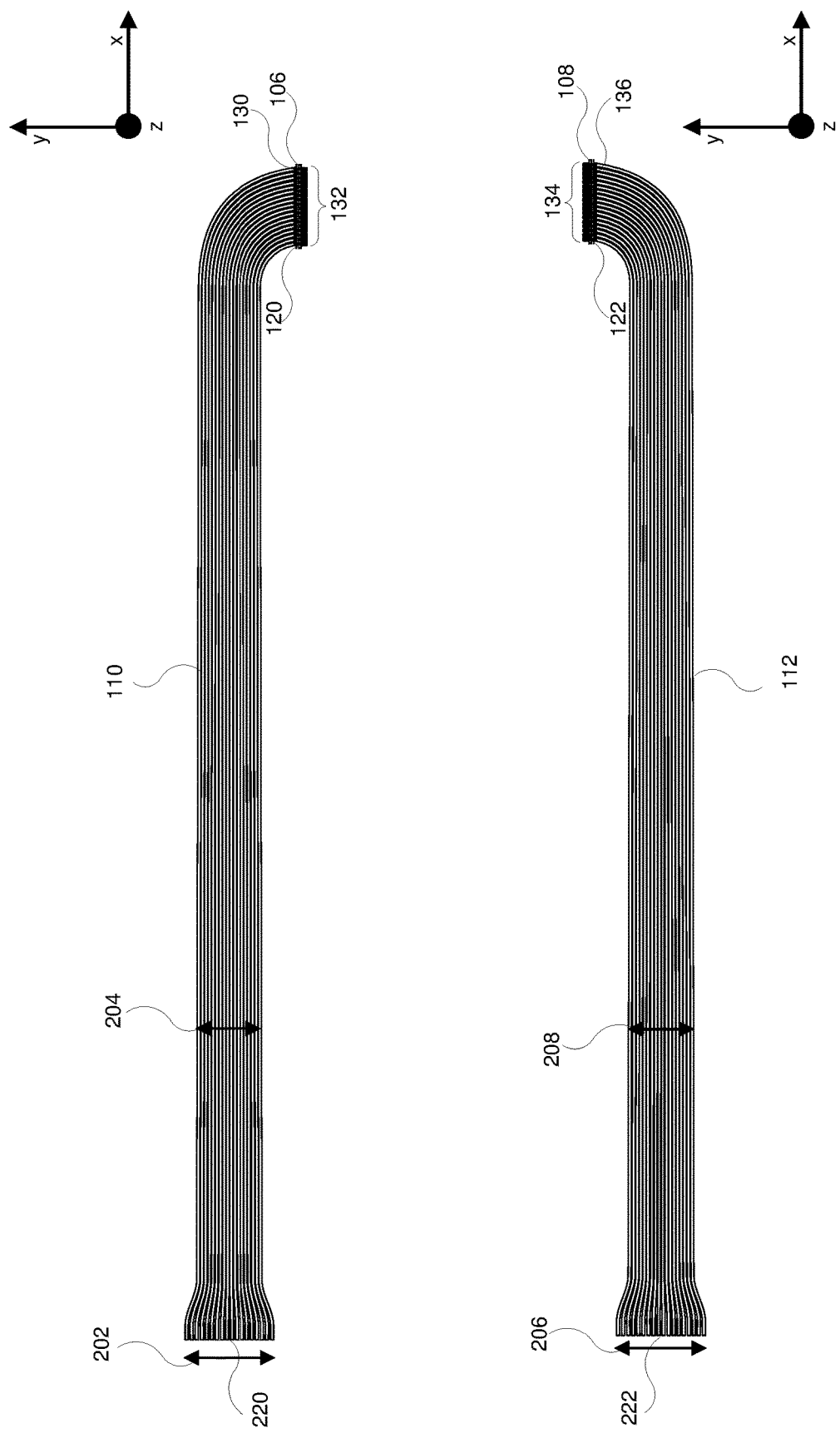
FIG. 2 is an illustration showing details of first pneumatic tubing and the second pneumatic tubing.

FIG. 2 is an illustration showing details of the first pneumatic tubing 110 and the second pneumatic tubing 112. The first pneumatic tubing 110 may include the first end 120 and a second end 220 opposite the first end 120. The second pneumatic tubing 112 may include the first end 122 and a second end 220 opposite the first end 122.

As shown in FIG. 2, the side 130 of the first connector 106 may be coupled to, connected to, or interfaced with the first end 120 of the first pneumatic tubing 110. Referring to FIG. 1, the second end 220 of the first pneumatic tubing 110 may be coupled to, connected to, or interfaced with the fluidic breakout 102 as will be described in more detail with reference to FIGS. 7 and 8. As shown in FIG. 2, the side 136 of the second connector 108 may be coupled to, connected to, or interfaced with the first end 122 of the second pneumatic tubing 112. Referring to FIG. 1, the second end 222 of the second pneumatic tubing 112 may be coupled to, connected to, or interfaced with the fluidic breakout 102 as will be described in more detail with reference to FIGS. 7 and 8.

In the example shown in FIG. 2, a width 202 of the second end 220 of the first pneumatic tubing 110 may be larger than (greater than) a width 204 of the first pneumatic tubing 110. In some implementations, the width 202 of the second end 220 of the first pneumatic tubing 110 may be the same as (approximately equal to) the width 204 of the first pneumatic tubing 110. In some implementations, the width 202 of the second end 220 of the first pneumatic tubing 110 may be smaller than (less than) the width 204 of the first pneumatic tubing 110. In the example shown in FIG. 2, a width 206 of the second end 222 of the second pneumatic tubing 112 may be larger than (greater than) a width 208 of the second pneumatic tubing 112. In some implementations, the width 206 of the second end 222 of the second pneumatic tubing 112 may be the same as (approximately equal to) the width 208 of the second pneumatic tubing 112. In some implementations, the width 206 of the second end 222 of the second pneumatic tubing 112 may be smaller than (less than) the width 208 of the second pneumatic tubing 112.

In some implementations, the width 204 of the first pneumatic tubing 110 may be the same as (approximately equal to) the width 208 of the second pneumatic tubing 112. In some implementations, the width 204 of the first pneumatic tubing 110 may be larger than (greater than) the width 208 of the second pneumatic tubing 112. In some implementations, the width 204 of the first pneumatic tubing 110 may be smaller than (less than) the width 208 of the second pneumatic tubing 112. In some implementations, the width 202 of the second end 220 of the first pneumatic tubing 110 may be the same as (approximately equal to) the width 206 of the second end 222 of the second pneumatic tubing 112. In some implementations, the width 202 of the second end 220 of the first pneumatic tubing 110 may be the larger than (greater than) the width 206 of the second end 222 of the second pneumatic tubing 112. In some implementations, the width 202 of the second end 220 of the first pneumatic tubing 110 may be the smaller than (less than) the width 206 of the second end 222 of the second pneumatic tubing 112

Figure 3A:
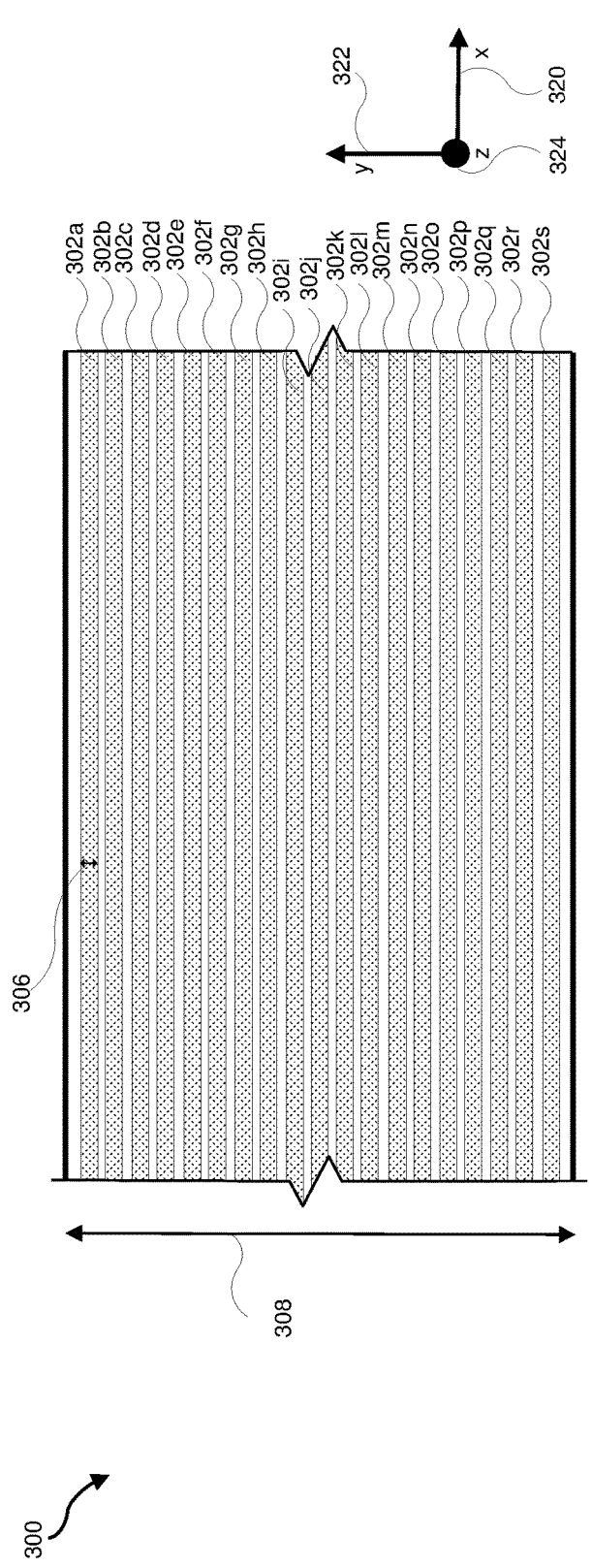
FIG. 3A is an illustration of an example cross-sectional view of a section of multichannel tubing for use in a fluidic system.

FIG. 3A is an illustration of an example cross-sectional view (cross-sectional view 300) of a section of multichannel tubing for use in a fluidic system. The cross-sectional view 300 may be perpendicular to a z axis 324 and parallel to an x axis 320 and a y axis 322. For example, the cross-sectional view 300 may be a cross-sectional view of the first pneumatic tubing 110. For example, the cross-sectional view 300 may be a cross-sectional view of the second pneumatic tubing 112. As shown in FIG. 3A, the section of the pneumatic tubing may have a width 308. For example, the width 308 may be the width 204 of the first pneumatic tubing 110. For example, the width 308 may be the width 208 of the second pneumatic tubing 112.

Figure 3B:
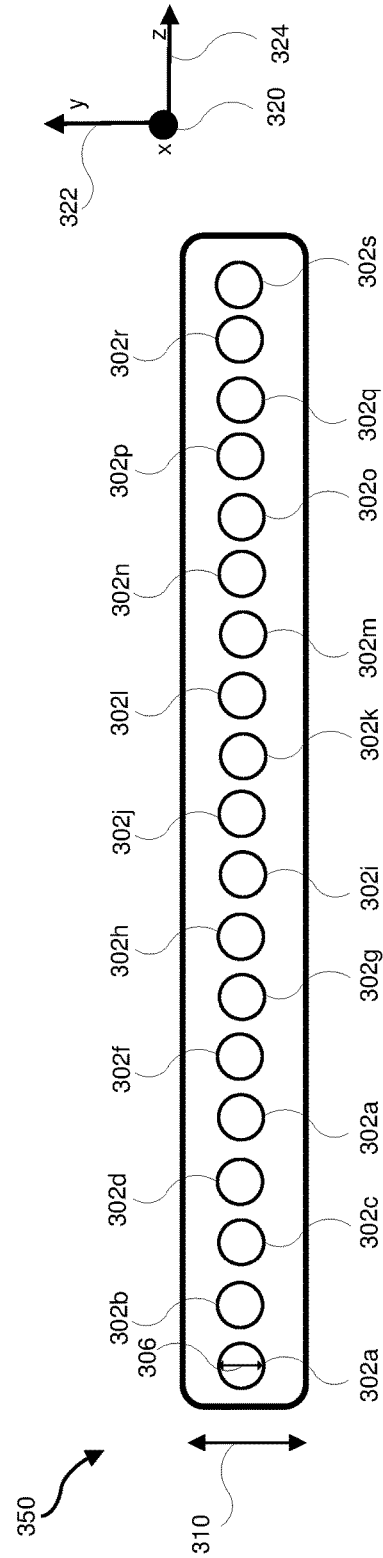
FIG. 3B is an illustration of an example of another cross-sectional view of a section of multichannel tubing for use in a fluidic system.

FIG. 3B is an illustration of an example of another cross-sectional view (cross-sectional view 350) of a section of multichannel tubing for use in a fluidic system. The cross-sectional view 350 may be perpendicular to the x axis 320 and parallel to the y axis 322 and the z axis 324. For example, the cross-sectional view 350 may be a cross-sectional view of the first pneumatic tubing 110. For example, the cross-sectional view 350 may be a cross-sectional view of the second pneumatic tubing 112. As shown in FIG. 3B, pneumatic tubing may have a thickness or height 310. For example, the height 310 may be a height of the first pneumatic tubing 110. For example, the height 310 may be a height of the second pneumatic tubing 112.

FIG. 3A shows the cross-sectional view 300 of multichannel tubing that includes tubes 302a-s. The tubes 302a-s may be used as high-density fluidic channels in a fluidic system. Referring to FIGS. 1 and 2, the section of multichannel tubing shown in the cross-sectional view 300 may represent any section of the first pneumatic tubing 110 and/or the second pneumatic tubing 112. The section of multichannel tubing shown in the cross-sectional view 350 may represent any section of the first pneumatic tubing 110 and/or the second pneumatic tubing 112. Multichannel tubing (e.g., the first pneumatic tubing 110, the second pneumatic tubing 112) included in a fluidic system (e.g., the fluidic system 100) may include tubes (e.g., the tubes 302a-s) with a small cross-sectional diameter. For example, a cross-sectional diameter of a tube (e.g., cross-sectional diameter 306 of the tube 302a) may be approximately 300 micrometers (um). In some implementations, a cross-sectional diameter of each pneumatic tube of multichannel tubing included in a fluidic system may be approximately the same. A cross-sectional diameter of each tube may be approximately equal to a cross-sectional diameter of another tube. In some implementations, a cross-sectional diameter of each tube may be different, however, a cross-sectional diameter of each tube may be considered small (e.g., approximately 300 um).

The use of tubes with small cross-sectional diameters (e.g., cross-sectional diameters around 300 um) in a fluidic system may allow for the packaging of high-density fluidic channels in a very small form-factor for use in a fluidic system. Referring to FIGS. 1, 2, and 3A-B, the tubes 302a-s may provide 19 fluidic channels packaged as pneumatic tubing having the width 308 and the height 310. For example, to achieve the desired very small form factor for the pneumatic tubing and subsequently the fluidic system, the width 308 may be approximately 11 millimeters (mm) and the height 310 may be approximately one mm.

Multichannel tubing (e.g., the first pneumatic tubing 110, the second pneumatic tubing 112) may be molded out of soft stretchable elastomers (e.g., silicone). In general, silicone may be considered a flexible plastic that exhibits many useful properties such as stretchability, low toxicity, and high heat resistance. In addition, silicone may also provide electrical insulation.

The use of soft stretchable elastomers may allow the multichannel tubing (e.g., the first pneumatic tubing 110, the second pneumatic tubing 112) to be easily stretched during articulation of fingers of a user when the multichannel tubing is used in a haptic feedback device as shown, for example, in FIGS. 9-11. The easy stretching of the multichannel tubing (e.g., the first pneumatic tubing 110, the second pneumatic tubing 112) during articulation of the fingers of the user may enable transparent interactions by the user when interacting with an AR/VR system. In addition, or in the alternative, the small cross-sectional fluidic channels may ensure that the cross-sectional area of the fluidic channels does not change significantly during the stretching of the multichannel tubing, thereby ensuring relatively static pressure-flow characteristics of the multichannel tubing.

The static pressure-flow characteristics of the multichannel tubing may result in a stable haptic response from a haptic feedback system connected to the multichannel tubing. The stable haptic response may occur because the characteristics of the pressure-flow provided by each tube of the multichannel tubing to a respective actuator included in the haptic feedback system may be relatively static.

Figure 4:
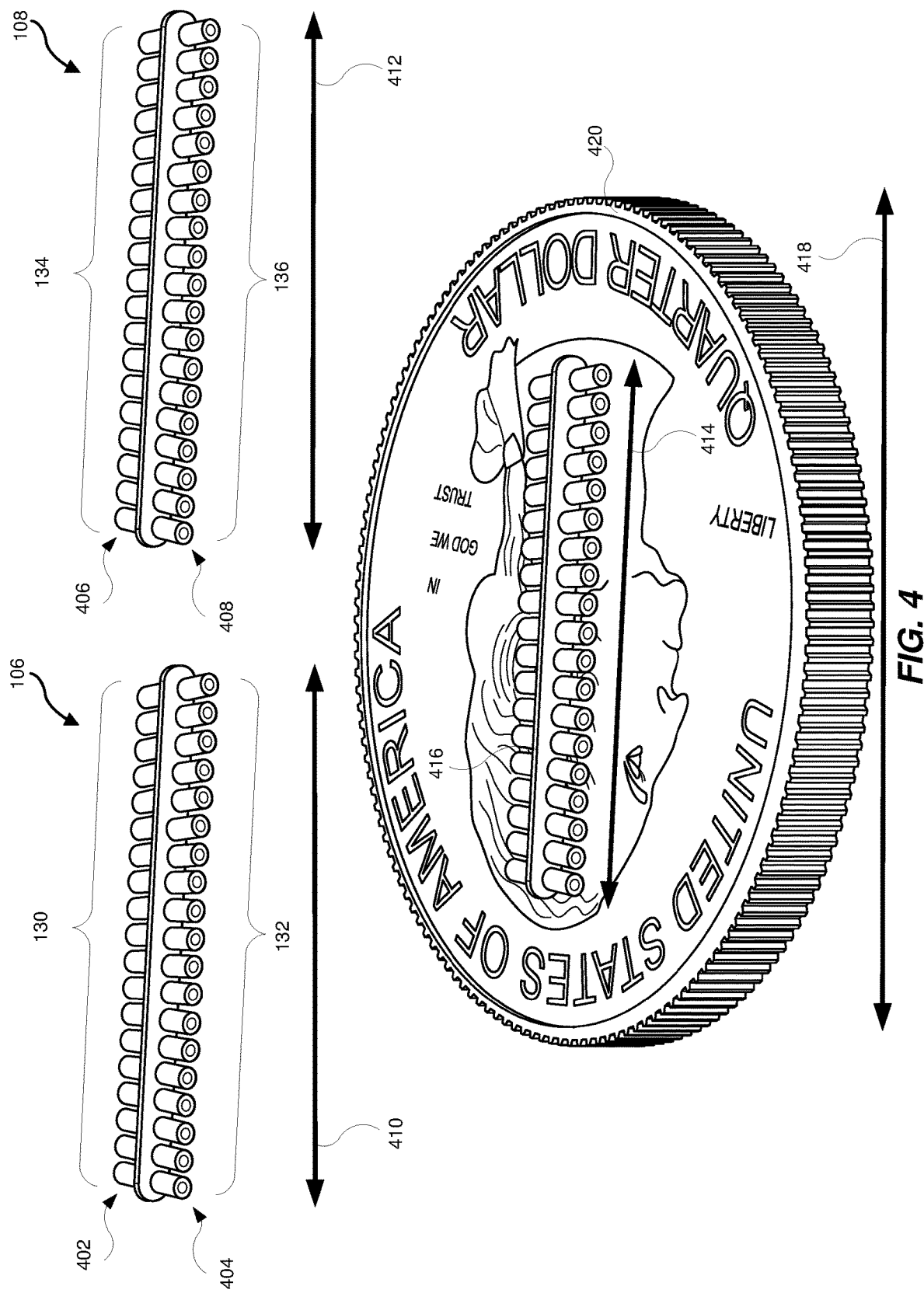
FIG. 4 is an illustration showing multichannel fluidic connectors for use in connecting, coupling, or interfacing an end of multichannel tubing to a side of a haptic feedback system.

FIG. 4 is an illustration showing multichannel fluidic connectors (e.g., first connector 106, second connector 108) for use in connecting, coupling, or interfacing an end of multichannel tubing to a side of a haptic feedback system. For example, a length 410 of the first connector 106 may be approximately 11 mm. A length 412 of the first connector 106 may be approximately 11 mm. In general, a length 414 of a multichannel fluidic connector 416 may be less than a diameter 418 of a United States quarter 420 (e.g., less than approximately 24 mm).

In some implementations, the multichannel fluidic connectors (e.g., first connector 106, second connector 108) may be printed using a high-resolution three-dimensional (3D) printing technique that allows for accurately printing fine resolution parts with good strength characteristics. For example, a multichannel fluidic connector (e.g., first connector 106, second connector 108) may be an approximately 25.4 micrometers (um) layer thickness part with a minimum features size of 50.8 um. In some implementations, a multichannel fluidic connector (e.g., first connector 106, second connector 108) may be printed using stereolithography (SLA) 3D printing using MicroFine™ material.

Multichannel fluidic connectors may integrate multiple pins or needles into a single component to ensure a leak-free connection between the multichannel tubing and a haptic feedback system while enabling an easy connection between the multichannel tubing and the haptic feedback system. For example, the first connector 106 may include pins 402 on the side 130 of the first connector 106 and pins 404 on the side 132 of the first connector 106. The second connector 108 may include pins 406 on the side 134 of the first connector 106 and pins 408 on the side 136 of the second connector 108. The multichannel fluidic connectors (e.g., first connector 106, second connector 108) may be designed and fabricated to provide an airtight connection with compressive stress between the multichannel tubing and the haptic feedback system. As such, additional mechanical coupling between the multichannel tubing and the haptic feedback system may not be necessary to maintain an airtight connection between the multichannel tubing and the haptic feedback system.

Figure 5:
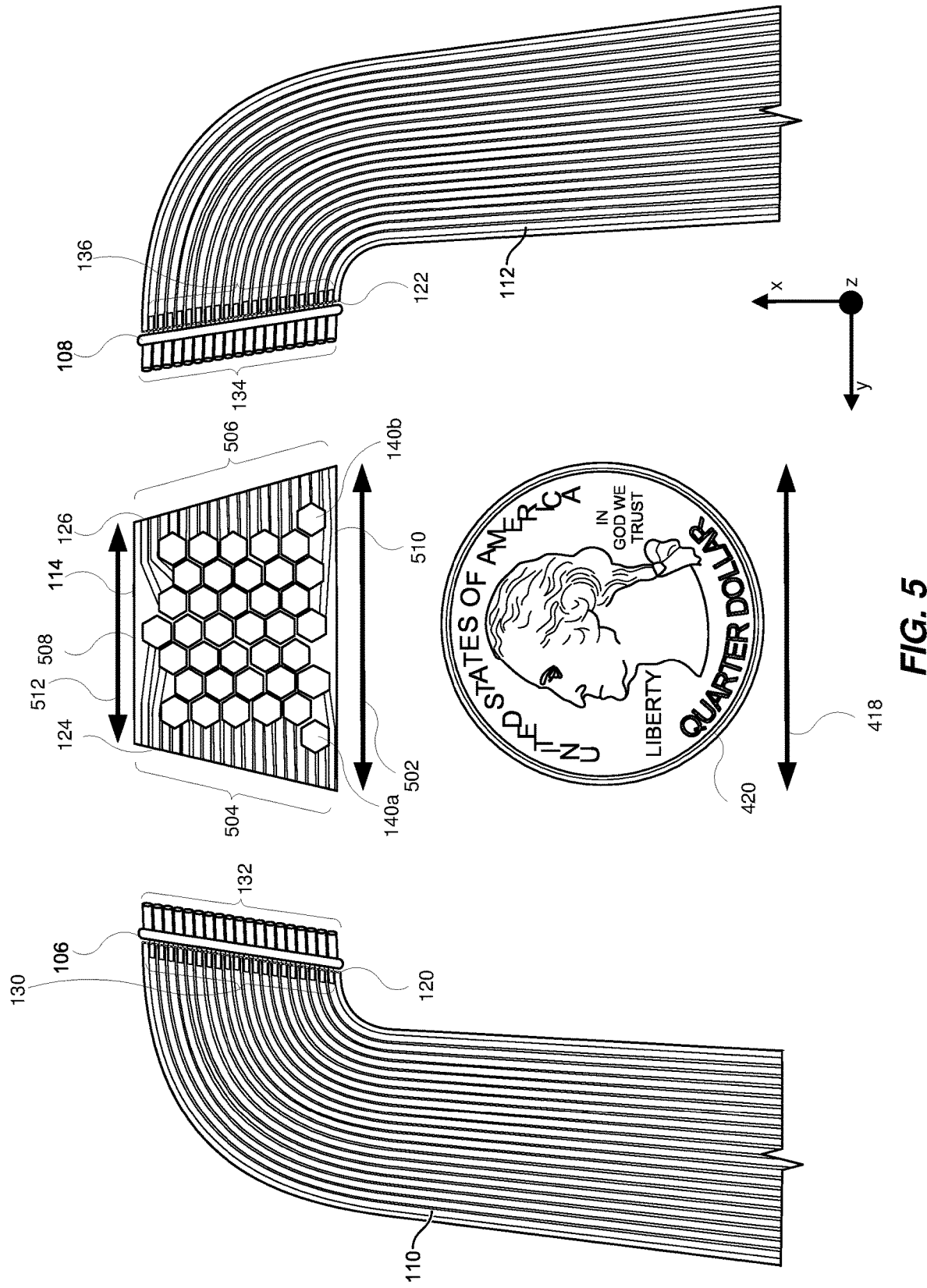
FIG. 5 is an illustration showing the details of the connecting of a haptic feedback system to multichannel tubing in a fluidic system.

FIG. 5 is an illustration showing the details of the connecting of a haptic feedback system to multichannel tubing in a fluidic system. Referring also to FIGS. 1, 2, 3A-B, and 4, the side 130 of the first connector 106 may be coupled to, connected to, or interfaced with the first end 120 of the first pneumatic tubing 110. In addition, or in the alternative, the side 136 of the second connector 108 may be coupled to, connected to, or interfaced with the first end 122 of the second pneumatic tubing 112. The first connector 106 may include pins 402 on the side 130 connected to the first pneumatic tubing 110. The second connector 108 may include pins 408 on the side 136 connected to the second pneumatic tubing 112. The multichannel tubing (e.g., the first pneumatic tubing 110, the second pneumatic tubing 112) may be designed and fabricated to provide an airtight and leak-free connection between the pins of the multichannel fluidic connectors (e.g., pins 402, pins 408) and each tube (e.g., tubes 302a-s) included in the multichannel tubing.

For example, where the section of multichannel tubing shown in the cross-sectional view 300 represents a section of the first pneumatic tubing 110, the coupling, connecting, or interfacing of each of the pins 402 in the first connector 106 to a respective tube of the tubes 302a-s may provide an airtight and leak-free connection between the pins 402 of the first connector 106 and each tube. Similarly, for example, where the section of multichannel tubing shown in the cross-sectional view 300 represents a section of the second pneumatic tubing 112, the coupling, connecting, or interfacing of each of the pins 408 in the second connector 108 to a respective tube of the tubes 302a-s may provide an airtight and leak-free connection between the pins 408 of the second connector 108 and each tube. The haptic feedback system 114 may include channels or actuation tubes 504 and channels or actuation tubes 506. The actuation tubes 504 and the actuation tubes 506 will be described in more detail with reference to FIG. 6.

Figure 6:
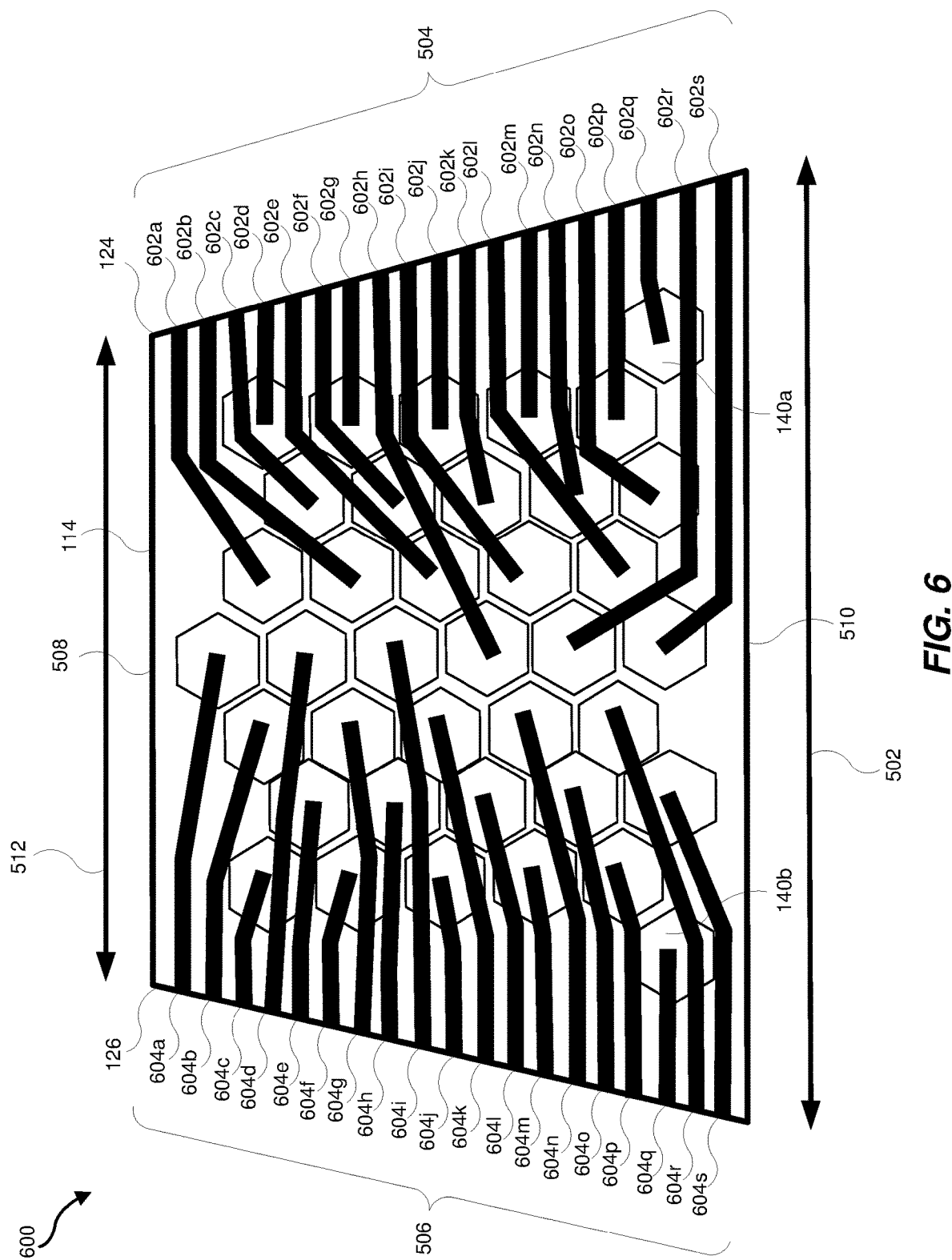
FIG. 6 is a bottom view of an example haptic feedback system.

FIG. 6 is a bottom view 600 of an example haptic feedback system. For example, FIG. 5 shows a top view of the haptic feedback system 114. FIG. 6 shows the bottom view 600 of the haptic feedback system 114. In some implementations, the haptic feedback system 114 may be a soft deformable high-density haptic bubble display. The haptic feedback system 114 may include channels or actuation tubes 602a-s and channels or actuation tubes 604a-s. The actuation tubes 602a-s and the actuation tubes 604a-s may be channels, inlets, or cantilever inlets that are routed underneath or below multiple actuators included in the haptic feedback system 114. For example, the actuation tubes 602a-s and the actuation tubes 604a-s may be in a second layer of the haptic feedback system 114 that is below a first layer of the haptic feedback system 114 that includes multiple actuators. As shown in FIG. 6, each actuation tube may be coupled to, connected to, or interfaced with a respective actuator included in the haptic feedback system 114. Referring to FIGS. 1 and 5, for example, actuation tube 604q may be coupled to, connected to, or interfaced with the actuator 140a. Actuation tube 602q may be coupled to, connected to, or interfaced with actuator 140b.

Each actuation tube included in a haptic feedback system may provide an inlet or channel to a respective actuator for delivery of a substance that changes shape in response to an applied force, such as a fluid (e.g., compressed air). As described herein referring to FIGS. 1, 2, 3A-B, 4, and 5, the fluidic system 100 may be a plug and play system that uses first connector 106 to provide a connection to or interface between the first pneumatic tubing 110 and the haptic feedback system 114. The fluidic system 100 may be a plug and play system that uses second connector 108 to provide a connection to or interface between the second pneumatic tubing 112 and the haptic feedback system 114. Specifically, the side 132 of the first connector 106 may be coupled to, connected to, or interfaced with the first side 124 of the haptic feedback system 114. In addition, or in the alternative, the side 134 of the second connector 108 may be coupled to, connected to, or interfaced with the second side 126 of the haptic feedback system 114. The multichannel fluidic connectors (e.g., the first connector 106, the second connector 108) and, for example, the pins of the multichannel fluidic connectors (e.g., the pins 404 and the pins 406, respectively) may be designed and fabricated to provide an airtight and leak-free connection between the pins of the multichannel fluidic connectors (e.g., the pins 404, the pins 406) and each actuation tube (e.g., actuation tubes 602a-s, actuation tubes 604a-s, respectively) included in the haptic feedback system 114.

The interconnection of multichannel tubing (e.g., the first pneumatic tubing 110, the second pneumatic tubing 112) to the haptic feedback system 114 using multichannel fluidic connectors (e.g., the first connector 106, the second connector 108, respectively) may provide an airtight and leak-free connection with compressive stress between the multichannel tubing and the actuator tubing of the haptic feedback system 114. As such, additional mechanical coupling between the multichannel tubing and the haptic feedback system may not be necessary in order to maintain the airtight connection between the multichannel tubing and the haptic feedback system.

Referring to FIGS. 5 and 6, a length of a haptic feedback system may be approximately equivalent to (approximately equal to) a diameter 418 of a United States quarter 420 (e.g., approximately 24 mm). In some implementations, a length 502 of a side 510 of the haptic feedback system 114 may be approximately equivalent to the diameter 418. In the example shown in FIGS. 5 and 6, a length 512 of a side 508 of the haptic feedback system 114 may be less than the length 502 of the side 510. In some implementations, the length 512 of the side 508 of the haptic feedback system 114 may be greater than the length 502 of the side 510. In some implementations, the length 512 of a side 508 of the haptic feedback system 114 may be the same as (approximately equal to) the length 502 of the side 510.

FIG. 7 is an illustration of an example internal structure 700 of a fluidic breakout that allows for direct plugging of pneumatic tubing to a plurality of pins or needles that protrude from the structure of fluidic breakout. Referring to FIG. 1, the example illustration of an internal structure 700 may be an example of an internal structure of the fluidic breakout 102. The fluidic breakout 102 may allow direct plugging of the first pneumatic tubing 110 and the second pneumatic tubing 112 to a plurality of needles (e.g., needles 144) that may protrude from the fluidic breakout 102.

FIG. 8 is an illustration of a view 800 of multichannel tubing for a fluidic system as it is placed in a mechanical clamp. A mechanical clamp may provide strain-relief for multichannel tubing when incorporated into a haptic feedback device or system. For example, referring to FIGS. 1 and 2, the view 800 shows the second end 220 of the first pneumatic tubing 110 and the second end 222 of the second pneumatic tubing 112 as they are placed in the mechanical clamp 104. For example, the mechanical clamp 104 may provide strain-relief for the first pneumatic tubing 110 and the second pneumatic tubing 112 as it enters the fluidic breakout 102.

FIGS. 9-11 include illustrations of an example fluidic system integrated with a glove. For example, the glove may be a fabric glove. FIGS. 9-11 show how easily the fluidic system may be integrated into a wearable device such as, for example, a glove. FIG. 9 is an illustration showing a first view 900 of the example fluidic system 100 as shown in FIG. 1 integrated with a glove 902. FIG. 10 is an illustration showing a second view 1000 of the example fluidic system 100 as shown in FIG. 1 integrated with the glove 902. FIG. 11 is an illustration showing a third view 1100 of the example fluidic system 100 as shown in FIG. 1 integrated with the glove 902.

FIG. 12 is an illustration of an example fluidic breakout. For example, a fluidic breakout 1202 may be printed in three-dimensions (3D printed) in silicone, generating a silicone fluidic breakout 1204. In the example shown in FIG. 12, the fluidic breakout 1202 may accommodate first pneumatic tubing that includes six tubes and second pneumatic tubing that includes six tubes. The tubes may be used as high-density fluidic channels in a fluidic system. The fluidic breakout 1202 may be similar to the fluidic breakout 102. A difference between the fluidic breakout 102 and the fluidic breakout 1202 may be the number of tubes each fluidic breakout may accommodate using first pneumatic tubing and second pneumatic tubing.

The silicone fluidic breakout 1204 may include needles 1206. Each needle may be connected or coupled to tubing that may deliver fluid from a fluidic control system to actuators connected or coupled to the first pneumatic tubing and the second pneumatic tubing. Examples of such fluidic systems are disclosed herein.

FIG. 13 is an illustration of an example silicone fluidic breakout on a wrist of a user. For example, the silicone fluidic breakout 1204 may be attached to a wrist 1302 of a hand of a user by way of a strap 1304. In some implementations, the silicone fluidic breakout 1204 may be the fluidic breakout 102 as shown in FIGS. 9-11.

FIGS. 14A-C are illustrations of an example demonstration of a wearable glove in a virtual reality system. FIG. 14A is an illustration of a rectangular block 1402 that a user may interact within a virtual reality (VR) environment. FIG. 14B is an illustration showing an example of a user interacting with a tablet-sized pressure sensor pad 1404 (e.g., a Sensel Morph pad) while wearing a glove 902 with an integrated fluidic system as shown, for example, in FIGS. 9-11. The sensor pad 1404 may be capable of sensing a finger contact position and finger contact force for control in a VR environment. For example, the user may control interactions with the rectangular block 1402 by moving one or more fingers of the user over and/or along the sensor pad 1404 while wearing the glove 902. The movements may include varying contact locations and/or contact pressure with the sensor pad 1404. FIG. 14C is an illustration showing an example of a fluidic control system 1410 that includes a plurality of pneumatic control components (e.g., pressure regulators). The fluidic control system 1410 may be used to control pressure in each individual actuator included in a haptic actuator (e.g., the haptic feedback system 114 as shown in FIG. 1).

A fluidic breakout may convert fine pneumatic channels in multichannel tubing to larger diameter individual pneumatic tubes. The pneumatic tubes may then be connected or hooked to pneumatic control components. For example, the pneumatic control components may be off-the-shelf components that include, but are not limited to, pressure regulators and pressure valves. For example, referring to FIGS. 1, 7, and 14C, to couple, connect, or interface the first pneumatic tubing 110 and the second pneumatic tubing 112 to a fluidic control system such as the example fluidic control system 1410, the fluidic breakout 102 may convert the pneumatic channels in the multichannel tubing of the first pneumatic tubing 110 and the second pneumatic tubing 112 to larger diameter individual pneumatic tubes 702. Each of the individual pneumatic tubes 702 may be connected to a respective needle of the needles 144. Each needle of the needles 144 may be coupled or connected to a pneumatic control component. For example, one or more of the needles 144 may be coupled to, connected to, interfaced to, or hooked to a respective tube of a pneumatic control component included in a fluidic control system (e.g., the fluidic control system 1410).

A fluidic breakout (e.g., the fluidic breakout 102, the silicone fluidic breakout 1204) may be designed to be worn on a wrist of a user. A fluidic breakout may provide an interface between a haptic glove (e.g., a glove, a wearable device) and a tabletop fluidic control unit. For example, the fluidic breakout 102 may be designed to be worn on a wrist of a user as shown, for example, in FIGS. 9-11. The silicone fluidic breakout 1204 may be designed to be worn on the wrist 1302 of a user as shown, for example, in FIG. 13. Referring to FIG. 14B, the fluidic breakout 102 may provide an interface between a haptic glove (e.g., the glove 902 that includes the fluidic system 100) and a tabletop fluidic control unit (e.g., the fluidic control system 1410).

A fluidic breakout may be an extension of electrical breakout boards in a fluidic domain. In some implementations, the fluidic breakout 102 may be fabricated using 3D printing techniques that 3D prints the structure of the fluidic breakout as one unit. An example of a 3D printed silicone fluidic breakout 1204 is shown, for example, in FIGS. 12 and 13. In some implementations, the needles 144 may be assembled onto a 3D printed part using adhesive. For example, referring to FIG. 12, the needles 1206 may be assembled onto a 3D printed part for the silicone fluidic breakout 1204 using adhesive. In addition, or in the alternative, the fluidic breakout 102 and/or the silicone fluidic breakout 1204 may be molded out of a soft stretchable elastomer (e.g., silicone) using a lost wax molding process. Molding or printing the fluidic breakout 102 and/or the silicone fluidic breakout 1204 out of a soft stretchable elastomer may allow the fluidic breakout to be compliant and more easily wearable in a wristwatch wearable formfactor such as that shown in FIGS. 9-11, and 13.

FIG. 15 is a block diagram of an example process 1500 for creating molded multichannel soft stretchable tubing. The process may be a manufacturing process that utilizes a partial curing and lost wax molding process. Referring to FIGS. 1, 2, and 5, the process 1500 may be performed when fabricating, creating, or generating the first pneumatic tubing 110 and/or the second pneumatic tubing 112.

In some implementations, the process 1500 may begin by fabricating, creating, or generating a tubing base molding on a build plate (step 1502). For example, a build plate 1520 may include one or more molds 1522a-d for use in fabricating, creating, or generating multichannel soft stretchable tubing (e.g., the first pneumatic tubing 110, the second pneumatic tubing 112). Each mold of the molds 1522a-d may be filled with a soft stretchable elastomer (e.g., silicone) forming a molded tubing base.

Next, the process 1500 may perform a two-step lost wax molding process that may include, as the first step, a partial curing of the molded tubing base for each mold (step 1504). For example, a partial curing of a molded silicone tubing base may include curing the tubing base at 60 degrees Centigrade (C) for approximately ten minutes. The partial curing may be for each of molded tubing bases 1526a-d. The second step of the two-step wax molding process may include creating a 3D model 1528 (e.g., using Computer Aided Design (CAD) software) of the tubing channels for 3D printing on a molded tubing base (step 1506). In some implementations, the process 1500 may perform step 1504 and step 1506 in parallel. In some implementations, the process may perform step 1504 before step 1502. In some implementations, the process 1500 may perform step 1502 before step 1504.

The process 1500 may perform a three-dimensional (3D) printing of one or more or channels in each of the partially cured molded tubing bases 1526a-d using the 3D model 1528 for the tubing channels to generate 3D printed base wax channels on each intermediate multichannel tubing 1530a-d (step 1508). Each intermediate multichannel tubing 1530a-d may include a plurality of 3D printed base wax channels on partially cured silicone. Referring to FIGS. 2 and 3A-B, the 3D printing may print channels along a length of a pneumatic tube (e.g., tubes 302a-s along or parallel to the x axis 320 for the first pneumatic tubing 110 and along or parallel to the x axis 320 for the second pneumatic tubing 112). For example, a cross-sectional diameter of a printed tube may be approximately 300 um.

Continuing, the process 1500 may perform one or more post molding steps to develop flat, high-density multichannel tubing of arbitrary shapes. The process 1500 may perform molding of soft stretchable tubing on a printed channel tubing base 1534 (e.g., silicone molding of a printed base wax channel) for one or more of the intermediate multichannel tubing 1530a-d by placing each intermediate multichannel tubing 1530a-d into a respective location 1532a-d in the printed channel tubing base 1534 (step 1510). The molding (e.g., silicone molding) may mold each multichannel tube into a desired thickness and shape. The process 1500 may generate individual multichannel tubes with wax (e.g., multichannel tube with wax 1536) of the desired thickness and shape that includes wax for subsequent removal (step 1512). The process 1500 may then perform, for each multichannel tube with wax, tubing wax removal (step 1514). For example, the process may perform the tubing wax removal at 90 degrees C. in an Isopropyl alcohol (IPA) bath, The IPA bath may dissolve the wax. The tubing wax removal may result in the generating of final multichannel tubing 1538 for use in a fluidic system. For example, referring to FIG. 1, the process 1500 may fabricate, create, or generate the first pneumatic tubing 110 and the second pneumatic tubing 112.

The process 1500 may allow for varying the width of the channels along the length of the tubing. Since the wax may be 3D printed with high precision (e.g., printed in 16 um layers), the process 1500 may allow for developing complex tubing geometry that may include varying a cross-sectional diameter of a channel throughout the length of the fluidic routing of the channel in a partially cured molded tubing base. The varying of a cross-sectional diameter of a channel throughout the length of the fluidic routing of the channel in a partially cured molded tubing base may aid in the development of multichannel tubing with varying widths. The ability to produce multichannel tubing with varying widths across a length of the tubing may allow for customizing an encumbrance of the multichannel tubing as the multichannel tubing is routed over different parts of a human limb (e.g., different parts of the hand of a user). The varying of cross-sectional channel diameters throughout the length of the fluidic routing may be leveraged to optimize the fluidic routing for a wearable device (e.g., a wearable glove) by providing curvature to the multichannel tubing and by reducing a width of the tubing in areas of the multichannel tubing that are routed over finger joints of a hand of a user. The varying of cross-sectional channel diameters throughout the length of the fluidic routing may allow for high density fluidic actuation that may be close to a human perceptual resolution in a wearable form-factor with very low encumbrance.

In addition, or in the alternative, because the process 1500 may be material agnostic, the process 1500 may be used to develop high density tubing using any room temperature curable materials. For example, the process 1500 may be material agnostic because the multichannel tubing may be created, generated, formed, and/or manufactured in any material that may be molded and cured in an ambient or room temperature environment. For example, the materials may include, but are not limited to, silicones and urethane acrylates.

Figure 16:
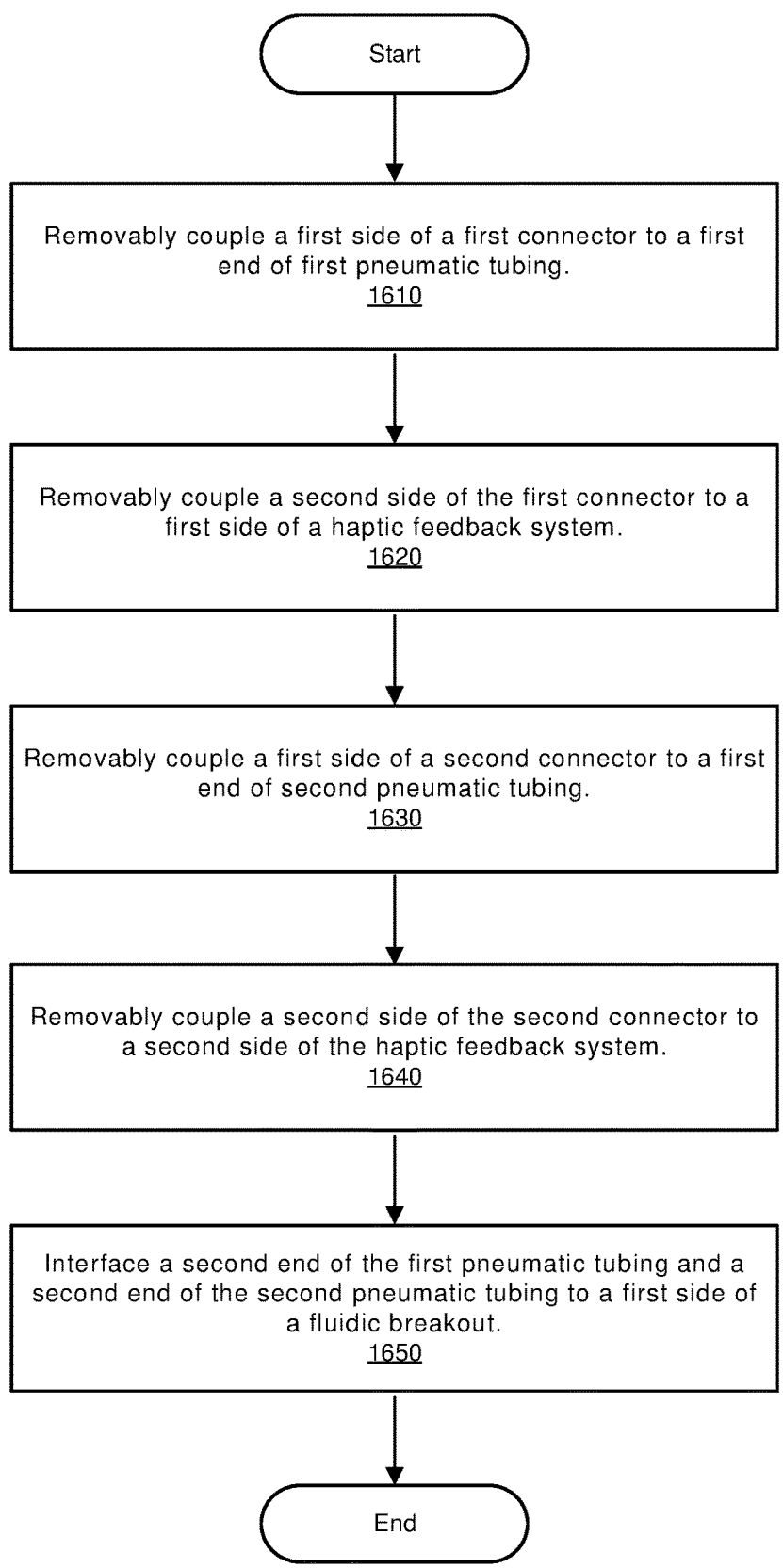
FIG. 16 is a flow diagram of an exemplary method for creating a fluidic system that includes quick disconnect plug and play multichannel tubing, connectors, and a fluidic breakout.

FIG. 16 is a flow diagram of an exemplary method 1600 for creating a fluidic system that includes quick disconnect plug and play multichannel tubing, connectors, and a fluidic breakout. In one example, each of the steps shown in FIG. 16 may be represented by multiple sub-steps, examples of which will be provided in greater detail below.

As illustrated in FIG. 16, at step 1610 one or more of the systems described herein may removably couple a first side of a first connector to a first end of first pneumatic tubing. For example, referring to FIGS. 1, 2, 3A-B, and 4-8, the side 130 of the first connector 106 may be removably coupled to, connected to, or interfaced with the first end 120 of the first pneumatic tubing 110.

As illustrated in FIG. 16, at step 1620 one or more of the systems described herein may removably couple a second side of the first connector to a first side of a haptic feedback system. For example, referring to FIGS. 1, 2, 3A-B, and 4-8, the side 132 of the first connector 106 may be removably coupled to, connected to, or interfaced with the first side 124 of the haptic feedback system 114.

As illustrated in FIG. 16, at step 1630 one or more of the systems described herein may removably couple a first side of a second connector to a first end of second pneumatic tubing. For example, referring to FIGS. 1, 2, 3A-B, and 4-8, the side 136 of the second connector 108 may be removably coupled to, connected to, or interfaced with the first end 122 of the second pneumatic tubing 112.

As illustrated in FIG. 16, at step 1640 one or more of the systems described herein may removably couple a second side of the second connector to a second side of the haptic feedback system. For example, referring to FIGS. 1, 2, 3A-B, and 4-8, the side 134 of the second connector 108 may be removably coupled to, connected to, or interfaced with the second side 126 of the haptic feedback system 114.

As illustrated in FIG. 16, at step 1650 one or more of the systems described herein may interface a second end of the first pneumatic tubing and a second end of the second pneumatic tubing to a first side of a fluidic breakout. For example, referring to FIGS. 1, 2, 3A-B, and 4-8, the second end 220 of the first pneumatic tubing 110 may be coupled to, connected to, or interfaced with the fluidic breakout 102 at the mechanical clamp 104. The second end 222 of the second pneumatic tubing 112 may be coupled to, connected to, or interfaced with the fluidic breakout 102 at the mechanical clamp 104. The mechanical clamp 104 may provide strain relief at the connection of the first pneumatic tubing 110 and the second pneumatic tubing 112 to the fluidic breakout 102. In some implementations, the second end 220 of the first pneumatic tubing 110 and the second end 222 of the second pneumatic tubing 112 may be removable coupled to, connected to, or interfaced with the fluidic breakout 102 at the mechanical clamp 104.

Figure 17:
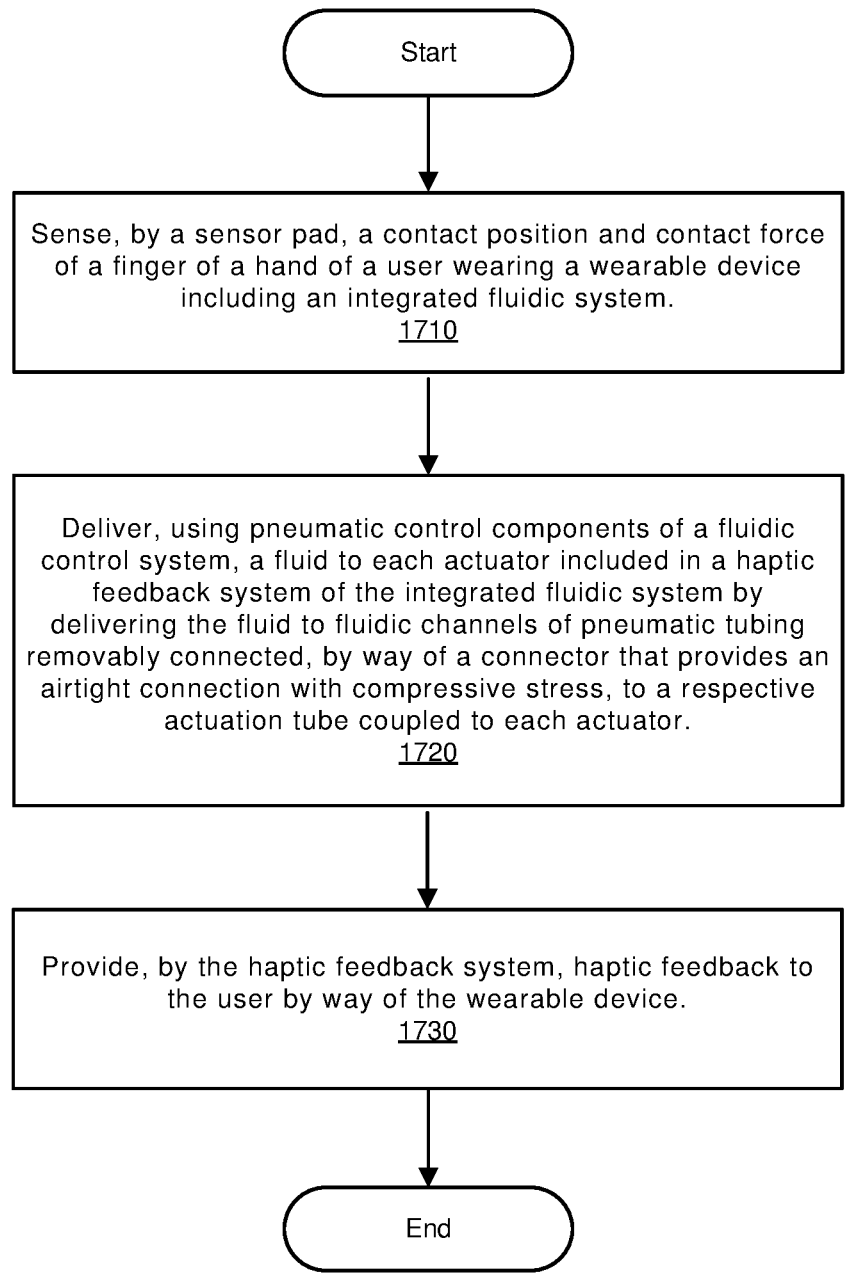
FIG. 17 is a flow diagram of an exemplary method for providing haptic feedback to a user of a wearable device that includes an integrated fluidic system that includes quick disconnect plug and play multichannel tubing, connectors, and a fluidic breakout.

FIG. 17 is a flow diagram of an exemplary method 1700 for providing haptic feedback to a user of a wearable device that includes an integrated fluidic system that includes quick disconnect plug and play multichannel tubing, connectors, and a fluidic breakout. In one example, each of the steps shown in FIG. 17 may be represented by multiple sub-steps, examples of which will be provided in greater detail below.

As illustrated in FIG. 17, at step 1710 one or more of the systems described herein may sense, by a sensor pad, a contact position and contact force of a finger of a hand of a user wearing a wearable device including an integrated fluidic system. For example, referring to FIGS. 9-11 and 14A-C, a user may wear a wearable device (e.g., the glove 902) on a hand of the user. The glove 902 may include an integrated fluidic system (e.g., the fluidic system). The sensor pad 1404 may sense a contact position (e.g., a finger contact position) and a contact force (e.g., a force of a finger on the sensor pad 1404 at the contact position) of a finger of the hand of the user that is wearing the wearable device (e.g., the glove 902 integrated with the fluidic system 100).

As illustrated in FIG. 17, at step 1720 one or more of the systems described herein may deliver, using pneumatic control components of a fluidic control system, a fluid to each actuator included in a haptic feedback system of the integrated fluidic system by delivering the fluid to fluidic channels of pneumatic tubing removably connected, by way of a connector that provides an airtight connection with compressive stress, to a respective actuation tube coupled to each actuator. For example, referring to FIGS. 1, 2, 3A-B, 4-13, and 14A-C, the fluidic control system 1410 may include a plurality of pneumatic control components (e.g., pressure regulators). Each pneumatic control component of the fluidic control system 1410 may deliver a fluid to each actuator included in the haptic feedback system 114 of the fluidic system 100. Each pneumatic control component of the fluidic control system 1410 may deliver a fluid to each actuator by delivering the fluid to the fluidic channels of the first pneumatic tubing 110 and the second pneumatic tubing 112. FIG. 3A shows example tubes 302a-s that may be used as high-density fluidic channels in pneumatic tubing of an integrated fluidic system.

The first pneumatic tubing 110 may be removably coupled to, connected to, or interfaced with the haptic feedback system 114 by way of the first connector 106. The second pneumatic tubing 112 may be removably coupled to, connected to, or interfaced with the haptic feedback system 114 by way of the second connector 108. The first connector 106 may provide an airtight connection with compressive stress to the actuation tubes 602a-s. Each actuation tube 602a-s may be coupled to, connected to, or interfaced with a respective actuator included in the haptic feedback system 114. For example, the actuation tube 602q may be coupled to, connected to, or interfaced with the actuator 140a. The second connector 108 may provide an airtight connection with compressive stress to the actuation tubes 604a-s. Each actuation tube 604a-s may be coupled to, connected to, or interfaced with a respective actuator included in the haptic feedback system 114. For example, the actuation tube 604q may be coupled to, connected to, or interfaced with the actuator 140b.

As illustrated in FIG. 17, at step 1730 one or more of the systems described herein may provide, by the haptic feedback system, haptic feedback to the user by way of the wearable device. For example, referring to FIGS. 9-11 and 14A-C, the glove 902 that includes the fluidic system 100 may provide haptic feedback to the user wearing the glove 902 by providing haptic feedback by way of the haptic feedback system 114.

A fluidic system may be architected for use in high density haptic actuation systems with fluidic actuators for use in fluidic systems for wearable devices for use in AR systems and/or VR systems. The wearable device that includes the fluidic system may provide fluidic routing that delivers fluid to actuators included in a haptic feedback system in a low encumbrance form-factor that preserves the modularity of the fluidic system by enabling quick assembly and/or disassembly of the different components in the fluidic system. The modularity of the fluidic system may be achieved using connectors that provide airtight connections with compressive stress between fluidic channels of pneumatic tubing and actuation tubes of the haptic feedback system. The airtight connections with compressive stress provide leak-free connections between the fluidic channels of the pneumatic tubing and the actuation tubes of the haptic feedback device. Including connectors that provide such connections allow for a plug and play experience for wearable haptic systems (e.g., wearable devices). The pneumatic tubing may be connected to a plug and play fluidic breakout, which converts the individual fluidic channels of the pneumatic tubing from the high-density tubing to individual tubes that may be connected to a fluidic control system (e.g., pressure regulators or fluidic valves). The fluidic system may have the benefit of assembly without the use of permanent adhesive bonding between components. Such assembly provides a modular system for the wearable device. Having such a modular system may allow for any failed components to be easily replaced without the need to replace the entire wearable device. In addition, or in the alternative, the entire modular system may be easily assembled without the use of any complex manufacturing and/or assembly processes.

Example 1

A system may include a fluidic system including a connector including a first side and a second side, each of the first side and the second side including a plurality of pins, a fluidic breakout configured to interface pneumatic tubing with a fluidic control system, pneumatic tubing including a plurality of fluidic channels, a first end configured to interface with the first side of the connector, and a second end configured to interface with the fluidic breakout, and a haptic feedback system including a plurality of actuators, each actuator coupled to a respective actuation tube configured to interface with a respective pin on the second side of the connector.

Example 2

The system of Example 1, where each pin of the plurality of pins of the first side of the connector may be configured to connect to a respective fluidic channel of the plurality of fluidic channels of the pneumatic tubing, and each pin of the plurality of pins of the second side of the connector may be configured to connect to a respective actuation tube on a first side of the haptic feedback system.

Example 3

The system of any of Examples 1 and 2, where a connection between the pneumatic tubing and the haptic feedback system includes a compressive stress connection.

Example 4

The system of any of Examples 1-3, where the fluidic breakout may include a plurality of needles, and each of the plurality of needles may be coupled to, on a first side, a respective fluidic channel of the plurality of fluidic channels of the pneumatic tubing, and on a second side opposite the first side, a pneumatic control component included in a fluidic control system.

Example 5

The system of Example 4, where each of the pneumatic control components of the fluidic control system may be coupled to a respective actuator included in the haptic feedback system in a manner that enables the pneumatic control components to deliver a fluid to each of the respective actuators.

Example 6

The system of any of Examples 1-5, where the fluidic breakout may include a mechanical clamp that provides strain relief for the second end of the pneumatic tubing.

Example 7

The system of any of Examples 1-6, where the pneumatic tubing may include a stretchable material.

Example 8

The system of any of Examples 1-7, where each of the plurality of fluidic channels of the pneumatic tubing may include a three-dimensional tube.

Example 9

The system of any of Examples 1-8, where a cross-sectional diameter of each of the plurality of fluidic channels may be less than approximately 300 micrometers.

Example 10

The system of any of Examples 1-9, where the system may further include a glove that may be integrated with the fluidic system.

Example 11

A method may include removably coupling a first side of a first connector to a first end of first pneumatic tubing, removably coupling a second side of the first connector to a first side of a haptic feedback system, removably coupling a first side of a second connector to a first end of second pneumatic tubing, removably coupling a second side of the second connector to a second side of the haptic feedback system, and interfacing a second end of the first pneumatic tubing and a second end of the second pneumatic tubing to a first side of a fluidic breakout.

Example 12

The method of Example 11, where the method may further include coupling each fluidic channel of a plurality of fluidic channels of the first pneumatic tubing and each fluidic channel of a plurality of fluidic channels of the second pneumatic tubing to a first side of a respective needle of a plurality of needles included in a second side of the fluidic breakout.

Example 13

The method of Example 12, where the method may further include removably coupling each pneumatic control component included in a fluidic control system to a second side of a respective needle of the plurality of needles included in the second side of the fluidic breakout.

Example 14

The method of any of Examples 11-13, where the method may further include fabricating the first pneumatic tubing and the second pneumatic tubing by, for each of the first pneumatic tubing and the second pneumatic tubing, generating a printed channel tubing base by printing a plurality of three-dimensional fluidic channels as base wax channels in partially cured silicone using a three-dimensional model, molding the printed channel tubing base to a particular thickness and shape, and removing the wax of the base wax channels by performing a tubing wax removal process.

Example 15

The method of any of Examples 11-14, where the method may further include fabricating the haptic feedback system to include a plurality of actuators, each actuator coupled to a respective actuation tube, fabricating the first connector to include a first plurality of pins on the first side of the first connector and a second plurality of pins on the second side of the first connector, and fabricating the second connector to include a first plurality of pins on the first side of the second connector and a second plurality of pins on the second side of the second connector.

Example 16

The method of Example 15, where removably coupling the first side of the first connector to the first end of the first pneumatic tubing may include forming an airtight connection with compressive stress between each pin of the first plurality of pins on the first side of the first connector and a respective fluidic channel of a plurality of fluidic channels included in the first pneumatic tubing, and removably coupling the second side of the first connector to the first side of the haptic feedback system may include forming an airtight connection with compressive stress between each pin of the second plurality of pins on the second side of the first connector and a respective actuation tube of an actuator included in the plurality of actuators.

Example 17

The method of any of Examples 15 and 16, where removably coupling the first side of the second connector to the first end of the second pneumatic tubing may include forming an airtight connection with compressive stress between each pin of the first plurality of pins on the first side of the second connector and a respective fluidic channel of a plurality of fluidic channels included in the first pneumatic tubing, and removably coupling the second side of the second connector to the second side of the haptic feedback system may include forming an airtight connection with compressive stress between each pin of the second plurality of pins on the second side of the second connector and a respective actuation tube of an actuator included in the plurality of actuators.

Example 18

A method may include sensing, by a sensor pad, a contact position and contact force of a finger of a hand of a user wearing a wearable device including an integrated fluidic system, delivering, using pneumatic control components of a fluidic control system, a fluid to each actuator included in a haptic feedback system of the integrated fluidic system by delivering the fluid to fluidic channels of pneumatic tubing removably connected, by way of a connector that provides an airtight connection with compressive stress, to a respective actuation tube coupled to each actuator, and providing, by the haptic feedback system, haptic feedback to the user by way of the wearable device.

Example 19

The method of Example 18, where the wearable device is a glove.

Example 20

The method of any of Examples 18 and 19, where the method may further include determining a routing of the pneumatic tubing to allow pressure-flow characteristics of the pneumatic tubing to remain consistent during articulation of the hand of the user.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1800 in FIG. 18) or that visually immerses a user in an artificial reality (such as, e.g., virtual-reality system 1900 in FIG. 19). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 18:
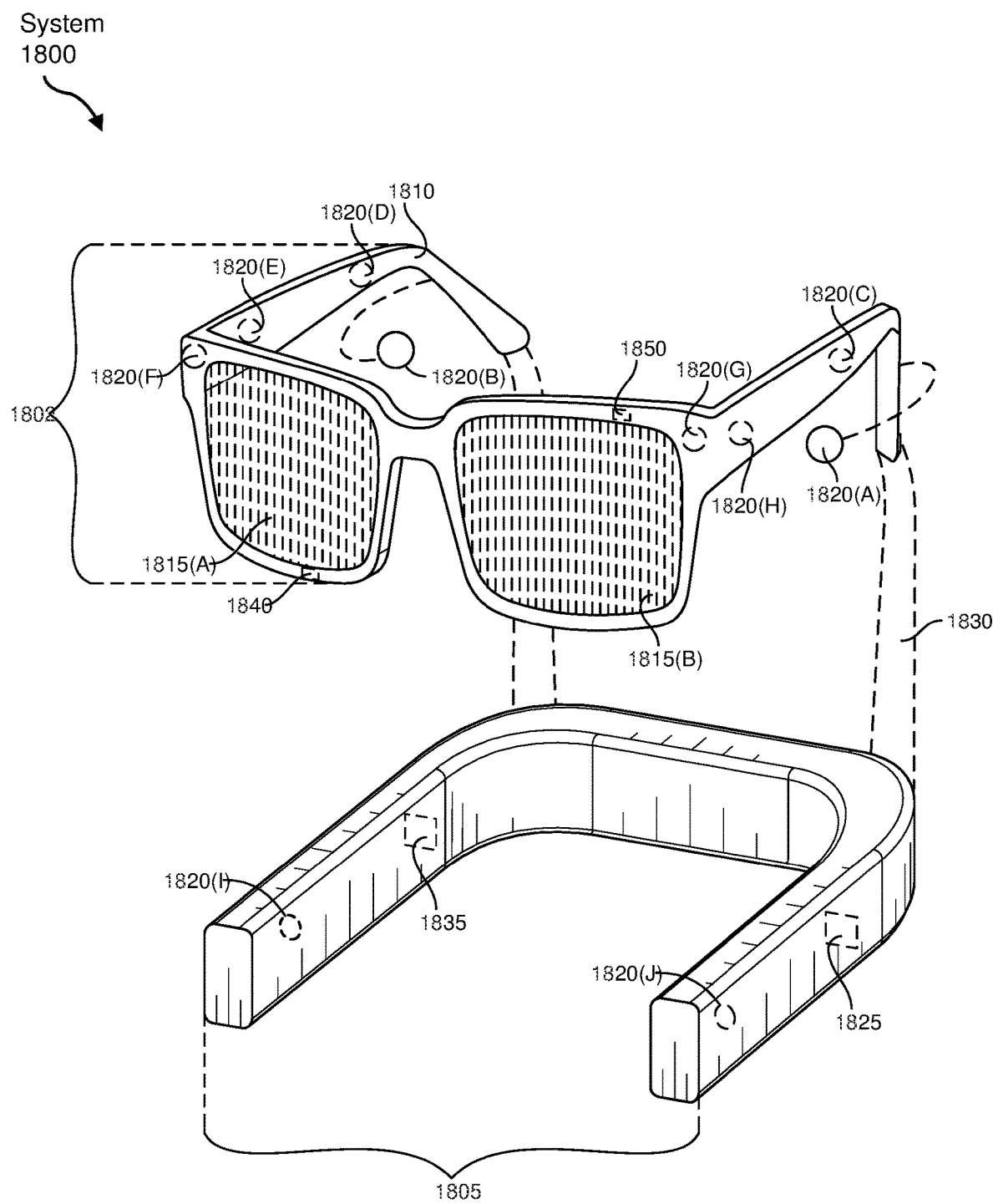
FIG. 18 is an illustration of exemplary augmented-reality glasses that may be used in connection with embodiments of this disclosure.

Turning to FIG. 18, augmented-reality system 1800 may include an eyewear device 1802 with a frame 1810 configured to hold a left display device 1815(A) and a right display device 1815(B) in front of a user's eyes. Display devices 1815(A) and 1815(B) may act together or independently to present an image or series of images to a user. While augmented-reality system 1800 includes two displays, embodiments of this disclosure may be implemented in augmented-reality systems with a single NED or more than two NEDs.

In some embodiments, augmented-reality system 1800 may include one or more sensors, such as sensor 1840. Sensor 1840 may generate measurement signals in response to motion of augmented-reality system 1800 and may be located on substantially any portion of frame 1810. Sensor 1840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1800 may or may not include sensor 1840 or may include more than one sensor. In embodiments in which sensor 1840 includes an IMU, the IMU may generate calibration data based on measurement signals from sensor 1840. Examples of sensor 1840 may include, without limitation, accelerometers, gyroscopes, magnetometers, other suitable types of sensors that detect motion, sensors used for error correction of the IMU, or some combination thereof.

In some examples, augmented-reality system 1800 may also include a microphone array with a plurality of acoustic transducers 1820(A)-1820(J), referred to collectively as acoustic transducers 1820. Acoustic transducers 1820 may represent transducers that detect air pressure variations induced by sound waves. Each acoustic transducer 1820 may be configured to detect sound and convert the detected sound into an electronic format (e.g., an analog or digital format). The microphone array in FIG. 19 may include, for example, ten acoustic transducers: 1820(A) and 1820(B), which may be designed to be placed inside a corresponding ear of the user, acoustic transducers 1820(C), 1820(D), 1820(E), 1820(F), 1820(G), and 1820(H), which may be positioned at various locations on frame 1810, and/or acoustic transducers 1820(I) and 1820(J), which may be positioned on a corresponding neckband 1805.

In some embodiments, one or more of acoustic transducers 1820(A)-(F) may be used as output transducers (e.g., speakers). For example, acoustic transducers 1820(A) and/or 1820(B) may be earbuds or any other suitable type of headphone or speaker.

The configuration of acoustic transducers 1820 of the microphone array may vary. While augmented-reality system 1800 is shown in FIG. 18 as having ten acoustic transducers 1820, the number of acoustic transducers 1820 may be greater or less than ten. In some embodiments, using higher numbers of acoustic transducers 1820 may increase the amount of audio information collected and/or the sensitivity and accuracy of the audio information. In contrast, using a lower number of acoustic transducers 1820 may decrease the computing power required by an associated controller 1850 to process the collected audio information. In addition, the position of each acoustic transducer 1820 of the microphone array may vary. For example, the position of an acoustic transducer 1820 may include a defined position on the user, a defined coordinate on frame 1810, an orientation associated with each acoustic transducer 1820, or some combination thereof.

Acoustic transducers 1820(A) and 1820(B) may be positioned on different parts of the user's ear, such as behind the pinna, behind the tragus, and/or within the auricle or fossa. Or, there may be additional acoustic transducers 1820 on or surrounding the ear in addition to acoustic transducers 1820 inside the ear canal. Having an acoustic transducer 1820 positioned next to an ear canal of a user may enable the microphone array to collect information on how sounds arrive at the ear canal. By positioning at least two of acoustic transducers 1820 on either side of a user's head (e.g., as binaural microphones), augmented-reality system 1800 may simulate binaural hearing and capture a 3D stereo sound field around about a user's head. In some embodiments, acoustic transducers 1820(A) and 1820(B) may be connected to augmented-reality system 1800 via a wired connection 1830, and in other embodiments acoustic transducers 1820(A) and 1820(B) may be connected to augmented-reality system 1800 via a wireless connection (e.g., a Bluetooth connection). In still other embodiments, acoustic transducers 1820(A) and 1820(B) may not be used at all in conjunction with augmented-reality system 1800.

Acoustic transducers 1820 on frame 1810 may be positioned in a variety of different ways, including along the length of the temples, across the bridge, above or below display devices 1815(A) and 1815(B), or some combination thereof. Acoustic transducers 1820 may also be oriented such that the microphone array is able to detect sounds in a wide range of directions surrounding the user wearing the augmented-reality system 1800. In some embodiments, an optimization process may be performed during manufacturing of augmented-reality system 1800 to determine relative positioning of each acoustic transducer 1820 in the microphone array.

In some examples, augmented-reality system 1800 may include or be connected to an external device (e.g., a paired device), such as neckband 1805. Neckband 1805 generally represents any type or form of paired device. Thus, the following discussion of neckband 1805 may also apply to various other paired devices, such as charging cases, smart watches, smartphones, wrist bands, other wearable devices, hand-held controllers, tablet computers, laptop computers, other external compute devices, etc.

As shown, neckband 1805 may be coupled to eyewear device 1802 via one or more connectors. The connectors may be wired or wireless and may include electrical and/or non-electrical (e.g., structural) components. In some cases, eyewear device 1802 and neckband 1805 may operate independently without any wired or wireless connection between them. While FIG. 18 illustrates the components of eyewear device 1802 and neckband 1805 in example locations on eyewear device 1802 and neckband 1805, the components may be located elsewhere and/or distributed differently on eyewear device 1802 and/or neckband 1805. In some embodiments, the components of eyewear device 1802 and neckband 1805 may be located on one or more additional peripheral devices paired with eyewear device 1802, neckband 1805, or some combination thereof.

Pairing external devices, such as neckband 1805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1800 may be provided by a paired device or shared between a paired device and an eyewear device, thus reducing the weight, heat profile, and form factor of the eyewear device overall while still retaining desired functionality. For example, neckband 1805 may allow components that would otherwise be included on an eyewear device to be included in neckband 1805 since users may tolerate a heavier weight load on their shoulders than they would tolerate on their heads. Neckband 1805 may also have a larger surface area over which to diffuse and disperse heat to the ambient environment. Thus, neckband 1805 may allow for greater battery and computation capacity than might otherwise have been possible on a stand-alone eyewear device. Since weight carried in neckband 1805 may be less invasive to a user than weight carried in eyewear device 1802, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1805 may be communicatively coupled with eyewear device 1802 and/or to other devices. These other devices may provide certain functions (e.g., tracking, localizing, depth mapping, processing, storage, etc.) to augmented-reality system 1800. In the embodiment of FIG. 18, neckband 1805 may include two acoustic transducers (e.g., 1820(I) and 1820(J)) that are part of the microphone array (or potentially form their own microphone subarray). Neckband 1805 may also include a controller 1825 and a power source 1835.

Acoustic transducers 1820(I) and 1820(J) of neckband 1805 may be configured to detect sound and convert the detected sound into an electronic format (analog or digital). In the embodiment of FIG. 18, acoustic transducers 1820(I) and 1820(J) may be positioned on neckband 1805, thereby increasing the distance between the neckband acoustic transducers 1820(I) and 1820(J) and other acoustic transducers 1820 positioned on eyewear device 1802. In some cases, increasing the distance between acoustic transducers 1820 of the microphone array may improve the accuracy of beamforming performed via the microphone array. For example, if a sound is detected by acoustic transducers 1820(C) and 1820(D) and the distance between acoustic transducers 1820(C) and 1820(D) is greater than, e.g., the distance between acoustic transducers 1820(D) and 1820(E), the determined source location of the detected sound may be more accurate than if the sound had been detected by acoustic transducers 1820(D) and 1820(E).

Controller 1825 of neckband 1805 may process information generated by the sensors on neckband 1805 and/or augmented-reality system 1800. For example, controller 1825 may process information from the microphone array that describes sounds detected by the microphone array. For each detected sound, controller 1825 may perform a direction-of-arrival (DOA) estimation to estimate a direction from which the detected sound arrived at the microphone array. As the microphone array detects sounds, controller 1825 may populate an audio data set with the information. In embodiments in which augmented-reality system 1800 includes an inertial measurement unit, controller 1825 may compute all inertial and spatial calculations from the IMU located on eyewear device 1802. A connector may convey information between augmented-reality system 1800 and neckband 1805 and between augmented-reality system 1800 and controller 1825. The information may be in the form of optical data, electrical data, wireless data, or any other transmittable data form. Moving the processing of information generated by augmented-reality system 1800 to neckband 1805 may reduce weight and heat in eyewear device 1802, making it more comfortable to the user.

Power source 1835 in neckband 1805 may provide power to eyewear device 1802 and/or to neckband 1805. Power source 1835 may include, without limitation, lithium ion batteries, lithium-polymer batteries, primary lithium batteries, alkaline batteries, or any other form of power storage. In some cases, power source 1835 may be a wired power source. Including power source 1835 on neckband 1805 instead of on eyewear device 1802 may help better distribute the weight and heat generated by power source 1835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1900 in FIG. 19, that mostly or completely covers a user's field of view. Virtual-reality system 1900 may include a front rigid body 1902 and a band 1904 shaped to fit around a user's head. Virtual-reality system 1900 may also include output audio transducers 1906(A) and 1906(B). Furthermore, while not shown in FIG. 19, front rigid body 1902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1800 and/or virtual-reality system 1900 may include one or more liquid crystal displays (LCDs), light emitting diode (LED) displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1800 and/or virtual-reality system 1900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1800 and/or virtual-reality system 1900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the systems 1800 and 1900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 20 illustrates a vibrotactile system 2000 in the form of a wearable glove (haptic device 2010) and wristband (haptic device 2020). Haptic device 2010 and haptic device 2020 are shown as examples of wearable devices that include a flexible, wearable textile material 2030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 2040 may be positioned at least partially within one or more corresponding pockets formed in textile material 2030 of vibrotactile system 2000. Vibrotactile devices 2040 may be positioned in locations to provide a vibrating sensation (e.g., haptic feedback) to a user of vibrotactile system 2000. For example, vibrotactile devices 2040 may be positioned against the user's finger(s), thumb, or wrist, as shown in FIG. 20. Vibrotactile devices 2040 may, in some examples, be sufficiently flexible to conform to or bend with the user's corresponding body part(s).

A power source 2050 (e.g., a battery) for applying a voltage to the vibrotactile devices 2040 for activation thereof may be electrically coupled to vibrotactile devices 2040, such as via conductive wiring 2052. In some examples, each of vibrotactile devices 2040 may be independently electrically coupled to power source 2050 for individual activation. In some embodiments, a processor 2060 may be operatively coupled to power source 2050 and configured (e.g., programmed) to control activation of vibrotactile devices 2040.

Vibrotactile system 2000 may be implemented in a variety of ways. In some examples, vibrotactile system 2000 may be a standalone system with integral subsystems and components for operation independent of other devices and systems. As another example, vibrotactile system 2000 may be configured for interaction with another device or system 2070. For example, vibrotactile system 2000 may, in some examples, include a communications interface 2080 for receiving and/or sending signals to the other device or system 2070. The other device or system 2070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 2080 may enable communications between vibrotactile system 2000 and the other device or system 2070 via a wireless (e.g., Wi-Fi, Bluetooth, cellular, radio, etc.) link or a wired link. If present, communications interface 2080 may be in communication with processor 2060, such as to provide a signal to processor 2060 to activate or deactivate one or more of the vibrotactile devices 2040.

Vibrotactile system 2000 may optionally include other subsystems and components, such as touch-sensitive pads 2090, pressure sensors, motion sensors, position sensors, lighting elements, and/or user interface elements (e.g., an on/off button, a vibration control element, etc.). During use, vibrotactile devices 2040 may be configured to be activated for a variety of different reasons, such as in response to the user's interaction with user interface elements, a signal from the motion or position sensors, a signal from the touch-sensitive pads 2090, a signal from the pressure sensors, a signal from the other device or system 2070, etc.

Although power source 2050, processor 2060, and communications interface 2080 are illustrated in FIG. 20 as being positioned in haptic device 2020, the present disclosure is not so limited. For example, one or more of power source 2050, processor 2060, or communications interface 2080 may be positioned within haptic device 2010 or within another wearable textile.

Figure 21:
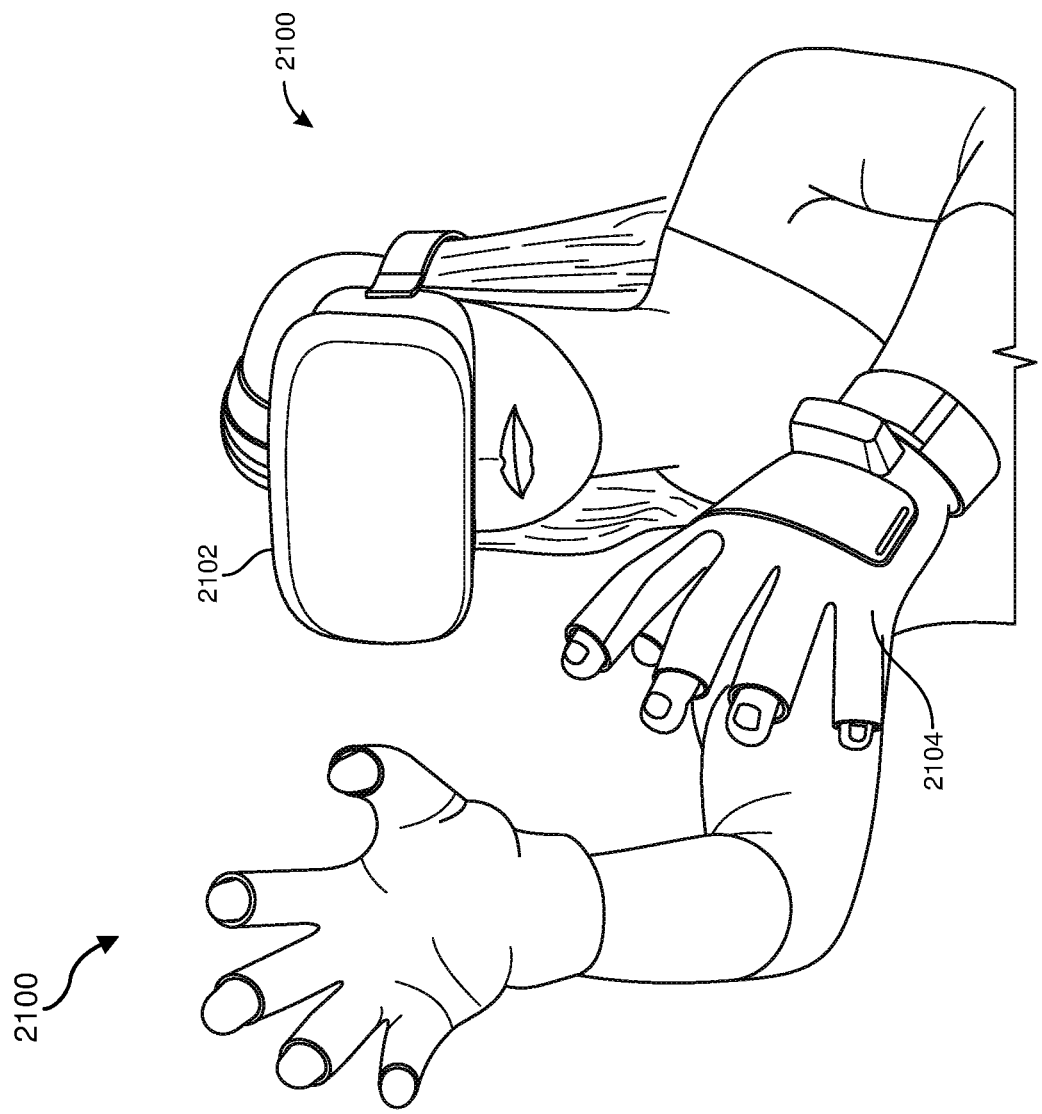
FIG. 21 is an illustration of an exemplary virtual-reality environment according to embodiments of this disclosure.

Haptic wearables, such as those shown in and described in connection with FIG. 20, may be implemented in a variety of types of artificial-reality systems and environments. FIG. 21 shows an example artificial-reality environment 2100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 19:
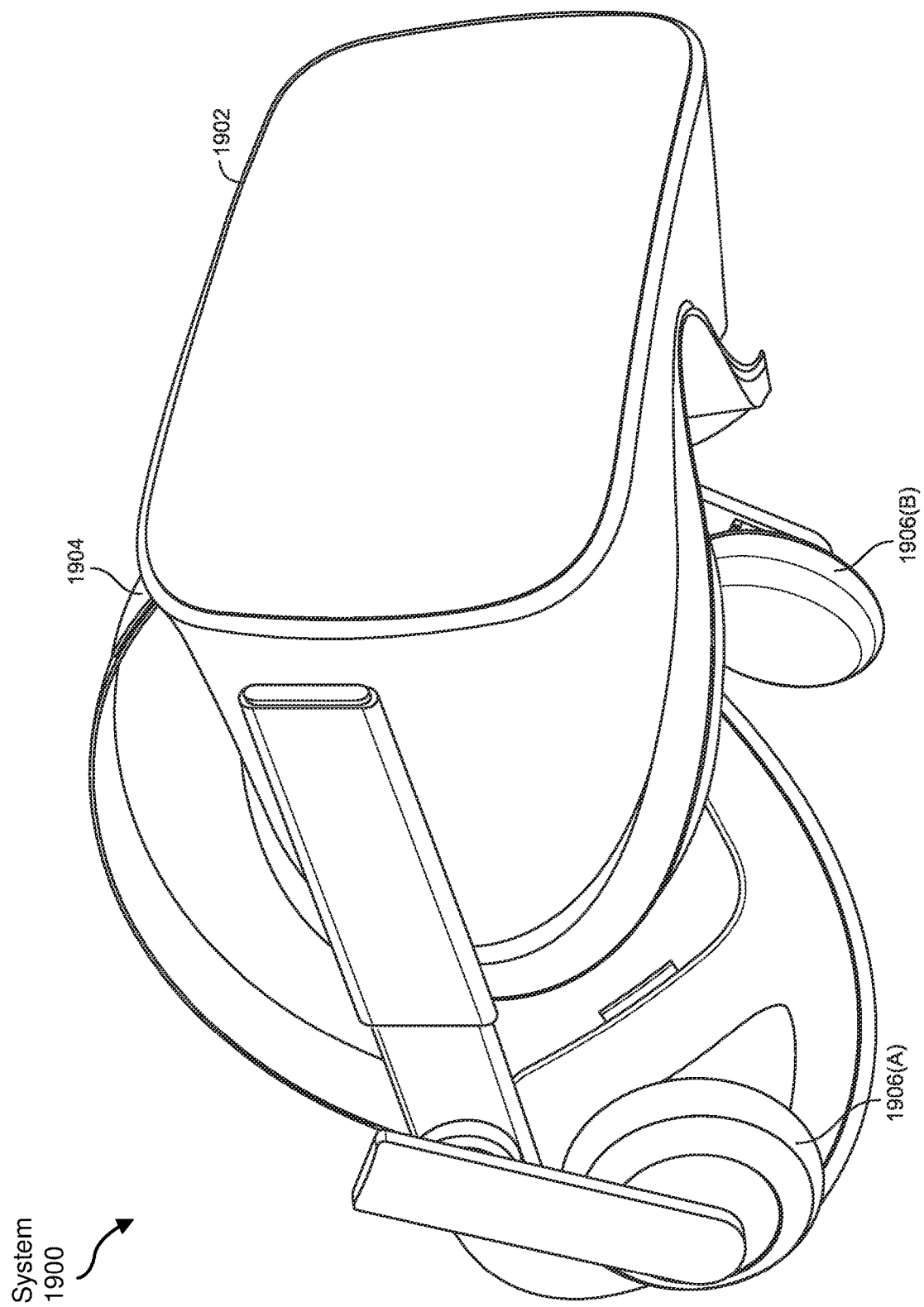
FIG. 19 is an illustration of an exemplary virtual-reality headset that may be used in connection with embodiments of this disclosure.

Head-mounted display 2102 generally represents any type or form of virtual-reality system, such as virtual-reality system 1900 in FIG. 19. Haptic device 2104 generally represents any type or form of wearable device, worn by a user of an artificial-reality system, that provides haptic feedback to the user to give the user the perception that he or she is physically engaging with a virtual object. In some embodiments, haptic device 2104 may provide haptic feedback by applying vibration, motion, and/or force to the user. For example, haptic device 2104 may limit or augment a user's movement. To give a specific example, haptic device 2104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2104 to send action requests to a console. Examples of action requests include, without limitation, requests to start an application and/or end the application and/or requests to perform a particular action within the application.

While haptic interfaces may be used with virtual-reality systems, as shown in FIG. 21, haptic interfaces may also be used with augmented-reality systems, as shown in FIG. 22. FIG. 22 is a perspective view of a user 2210 interacting with an augmented-reality system 2200. In this example, user 2210 may wear a pair of augmented-reality glasses 2220 that may have one or more displays 2222 and that are paired with a haptic device 2230. In this example, haptic device 2230 may be a wristband that includes a plurality of band elements 2232 and a tensioning mechanism 2234 that connects band elements 2232 to one another.

One or more of band elements 2232 may include any type or form of actuator suitable for providing haptic feedback. For example, one or more of band elements 2232 may be configured to provide one or more of various types of cutaneous feedback, including vibration, force, traction, texture, and/or temperature. To provide such feedback, band elements 2232 may include one or more of various types of actuators. In one example, each of band elements 2232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 2010, 2020, 2104, and 2230 may include any suitable number and/or type of haptic transducer, sensor, and/or feedback mechanism. For example, haptic devices 2010, 2020, 2104, and 2230 may include one or more mechanical transducers, piezoelectric transducers, and/or fluidic transducers. Haptic devices 2010, 2020, 2104, and 2230 may also include various combinations of different types and forms of transducers that work together or independently to enhance a user's artificial-reality experience. In one example, each of band elements 2232 of haptic device 2230 may include a vibrotactor (e.g., a vibrotactile actuator) configured to vibrate in unison or independently to provide one or more of various types of haptic sensations to a user.

Figure 23:
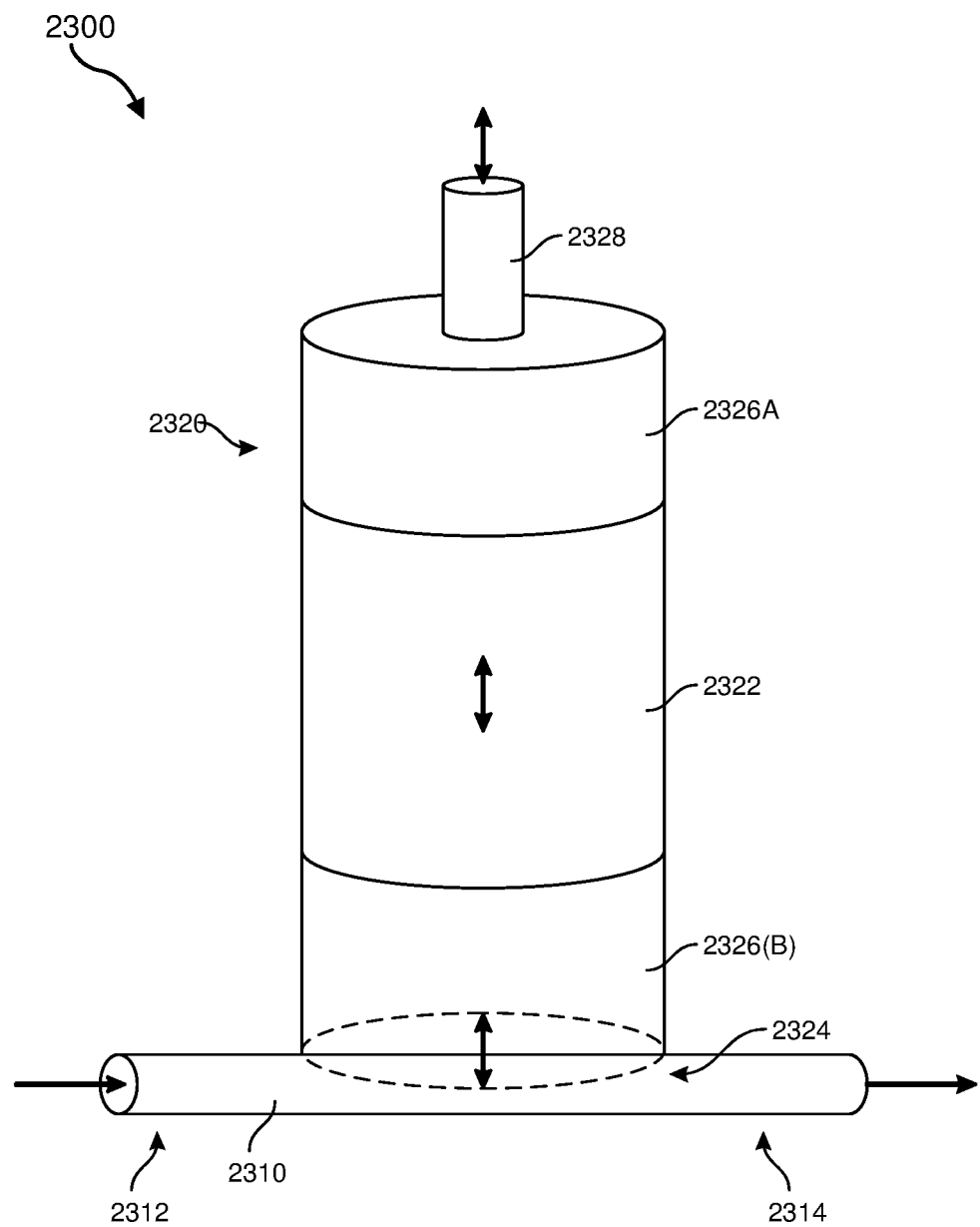
FIG. 23 is an illustration of an exemplary fluidic valve that may be used in connection with embodiments of this disclosure.

As noted above, the present disclosure may also include haptic fluidic systems that involve the control (e.g., stopping, starting, restricting, increasing, etc.) of fluid flow through a fluid channel. The control of fluid flow may be accomplished with a fluidic valve. FIG. 23 shows a schematic diagram of a fluidic valve 2300 for controlling flow through a fluid channel 2310, according to at least one embodiment of the present disclosure. Fluid from a fluid source (e.g., a pressurized fluid source, a fluid pump, etc.) may flow through the fluid channel 2310 from an inlet port 2312 to an outlet port 2314, which may be operably coupled to, for example, a fluid-driven mechanism, another fluid channel, or a fluid reservoir.

Fluidic valve 2300 may include a gate 2320 for controlling the fluid flow through fluid channel 2310. Gate 2320 may include a gate transmission element 2322, which may be a movable component that is configured to transmit an input force, pressure, or displacement to a restricting region 2324 to restrict or stop flow through the fluid channel 2310. Conversely, in some examples, application of a force, pressure, or displacement to gate transmission element 2322 may result in opening restricting region 2324 to allow or increase flow through the fluid channel 2310. The force, pressure, or displacement applied to gate transmission element 2322 may be referred to as a gate force, gate pressure, or gate displacement. Gate transmission element 2322 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 23, gate 2320 of fluidic valve 2300 may include one or more gate terminals, such as an input gate terminal 2326(A) and an output gate terminal 2326(B) (collectively referred to herein as "gate terminals 2326") on opposing sides of gate transmission element 2322. Gate terminals 2326 may be elements for applying a force (e.g., pressure) to gate transmission element 2322. By way of example, gate terminals 2326 may each be or include a fluid chamber adjacent to gate transmission element 2322. Alternatively or additionally, one or more of gate terminals 2326 may include a solid component, such as a lever, screw, or piston, that is configured to apply a force to gate transmission element 2322.

In some examples, a gate port 2328 may be in fluid communication with input gate terminal 2326(A) for applying a positive or negative fluid pressure within the input gate terminal 2326(A). A control fluid source (e.g., a pressurized fluid source, a fluid pump, etc.) may be in fluid communication with gate port 2328 to selectively pressurize and/or depressurize input gate terminal 2326(A). In additional embodiments, a force or pressure may be applied at the input gate terminal 2326(A) in other ways, such as with a piezoelectric element or an electromechanical actuator, etc.

In the embodiment illustrated in FIG. 23, pressurization of the input gate terminal 2326(A) may cause the gate transmission element 2322 to be displaced toward restricting region 2324, resulting in a corresponding pressurization of output gate terminal 2326(B). Pressurization of output gate terminal 2326(B) may, in turn, cause restricting region 2324 to partially or fully restrict to reduce or stop fluid flow through the fluid channel 2310. Depressurization of input gate terminal 2326(A) may cause gate transmission element 2322 to be displaced away from restricting region 2324, resulting in a corresponding depressurization of the output gate terminal 2326(B). Depressurization of output gate terminal 2326(B) may, in turn, cause restricting region 2324 to partially or fully expand to allow or increase fluid flow through fluid channel 2310. Thus, gate 2320 of fluidic valve 2300 may be used to control fluid flow from inlet port 2312 to outlet port 2314 of fluid channel 2310. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
a fluidic system comprising:
a connector comprising a first side and a second side, each of the first side and the second side comprising a plurality of pins;
a fluidic breakout configured to interface pneumatic tubing with a fluidic control system;
pneumatic tubing comprising:
a plurality of fluidic channels;
a first end configured to interface with the first side of the connector; and
a second end configured to interface with the fluidic breakout; and
a haptic feedback system comprising a plurality of actuators, each actuator coupled to a respective actuation tube configured to interface with a respective pin on the second side of the connector.

2. The system of claim 1, wherein:
each pin of the plurality of pins of the first side of the connector are configured to connect to a respective fluidic channel of the plurality of fluidic channels of the pneumatic tubing; and
each pin of the plurality of pins of the second side of the connector are configured to connect to a respective actuation tube on a first side of the haptic feedback system.

3. The system of claim 2, wherein a connection between the pneumatic tubing and the haptic feedback system comprises a compressive stress connection.

4. The system of claim 3, wherein:
the fluidic breakout comprises a plurality of needles; and
each of the plurality of needles is coupled to:
on a first side, a respective fluidic channel of the plurality of fluidic channels of the pneumatic tubing; and
on a second side opposite the first side, a pneumatic control component included in a fluidic control system.

5. The system of claim 4, wherein each of the pneumatic control components of the fluidic control system are coupled to a respective actuator included in the haptic feedback system in a manner that enables the pneumatic control components to deliver a fluid to each of the respective actuators.

6. The system of claim 1, wherein the fluidic breakout comprises a mechanical clamp that provides strain relief for the second end of the pneumatic tubing.

7. The system of claim 1, wherein the pneumatic tubing comprises a stretchable material.

8. The system of claim 7, wherein each of the plurality of fluidic channels of the pneumatic tubing comprise a three-dimensional tube.

9. The system of claim 8, wherein a cross-sectional diameter of each of the plurality of fluidic channels is less than approximately 300 micrometers.

10. The system of claim 1, further comprising a glove, wherein the glove is integrated with the fluidic system.

11. A method comprising:
removably coupling a first side of a first connector to a first end of first pneumatic tubing;
removably coupling a second side of the first connector to a first side of a haptic feedback system;
removably coupling a first side of a second connector to a first end of second pneumatic tubing;
removably coupling a second side of the second connector to a second side of the haptic feedback system; and
interfacing a second end of the first pneumatic tubing and a second end of the second pneumatic tubing to a first side of a fluidic breakout.

12. The method of claim 11, further comprising coupling each fluidic channel of a plurality of fluidic channels of the first pneumatic tubing and each fluidic channel of a plurality of fluidic channels of the second pneumatic tubing to a first side of a respective needle of a plurality of needles included in a second side of the fluidic breakout.

13. The method of claim 12, further comprising removably coupling each pneumatic control component included in a fluidic control system to a second side of a respective needle of the plurality of needles included in the second side of the fluidic breakout.

14. The method of claim 11, further comprising fabricating the first pneumatic tubing and the second pneumatic tubing by, for each of the first pneumatic tubing and the second pneumatic tubing:
generating a printed channel tubing base by printing a plurality of three-dimensional fluidic channels as base wax channels in partially cured silicone using a three-dimensional model;
molding the printed channel tubing base to a particular thickness and shape; and
removing the wax of the base wax channels by performing a tubing wax removal process.

15. The method of claim 11, further comprising:
fabricating the haptic feedback system to include a plurality of actuators, each actuator coupled to a respective actuation tube;
fabricating the first connector to include a first plurality of pins on the first side of the first connector and a second plurality of pins on the second side of the first connector; and
fabricating the second connector to include a first plurality of pins on the first side of the second connector and a second plurality of pins on the second side of the second connector.

16. The method of claim 15, wherein:
removably coupling the first side of the first connector to the first end of the first pneumatic tubing comprises forming an airtight connection with compressive stress between each pin of the first plurality of pins on the first side of the first connector and a respective fluidic channel of a plurality of fluidic channels included in the first pneumatic tubing; and
removably coupling the second side of the first connector to the first side of the haptic feedback system comprises forming an airtight connection with compressive stress between each pin of the second plurality of pins on the second side of the first connector and a respective actuation tube of an actuator included in the plurality of actuators.

17. The method of claim 15, wherein:
removably coupling the first side of the second connector to the first end of the second pneumatic tubing comprises forming an airtight connection with compressive stress between each pin of the first plurality of pins on the first side of the second connector and a respective fluidic channel of a plurality of fluidic channels included in the first pneumatic tubing; and removably coupling the second side of the second connector to the second side of the haptic feedback system comprises forming an airtight connection with compressive stress between each pin of the second plurality of pins on the second side of the second connector and a respective actuation tube of an actuator included in the plurality of actuators.

18. A method comprising:

sensing, by a sensor pad, a contact position and contact force of a finger of a hand of a user wearing a wearable device including an integrated fluidic system;

delivering, using pneumatic control components of a fluidic control system, a fluid to each actuator included in a haptic feedback system of the integrated fluidic system by delivering the fluid to fluidic channels of pneumatic tubing removably connected, by way of a connector that provides an airtight connection with compressive stress, to a respective actuation tube coupled to each actuator; and providing, by the haptic feedback system, haptic feedback to the user by way of the wearable device.

19. The method of claim 18, wherein the wearable device is a glove.

20. The method of claim 19, further comprising determining a routing of the pneumatic tubing to allow pressure-flow characteristics of the pneumatic tubing to remain consistent during articulation of the hand of the user.

* * * * *